United States Patent [19]
Yoshinobu

[11] Patent Number: 5,682,599
[45] Date of Patent: Oct. 28, 1997

[54] TWO-WAY BROADCASTING AND RECEIVING SYSTEM WITH TIME LIMIT AND/OR LIMIT DATA

[75] Inventor: Hitoshi Yoshinobu, Kanagawa, Japan

[73] Assignee: Sony Corporation, Tokyo, Japan

[21] Appl. No.: 360,101

[22] Filed: Dec. 20, 1994

[30] Foreign Application Priority Data

Dec. 24, 1993 [JP] Japan .................................. 5-347328
Feb. 25, 1994 [JP] Japan .................................. 6-053148

[51] Int. Cl.$^6$ ................................................. H04N 7/173
[52] U.S. Cl. .................. 455/5.1; 455/6.2; 348/12; 348/10
[58] Field of Search .......................... 348/7, 12, 13, 348/6, 8, 10, 1, 2, 11; 455/4.2, 5.1, 6.1, 2, 6.2, 6.3; 379/92; H04N 7/16, 7/173

[56] References Cited

U.S. PATENT DOCUMENTS

| | | |
|---|---|---|
| 4,329,684 | 5/1982 | Monteath et al. . |
| 4,390,901 | 6/1983 | Keiser . |
| 4,488,179 | 12/1984 | Krüger et al. . |
| 4,584,602 | 4/1986 | Nakagawa ............................ 379/92 |
| 4,635,121 | 1/1987 | Hoffman et al. . |
| 4,706,121 | 11/1987 | Young . |
| 4,847,886 | 7/1989 | Chumley ............................ 379/56 |
| 5,012,510 | 4/1991 | Schaubs et al. ....................... 379/92 |
| 5,151,789 | 9/1992 | Young . |
| 5,191,410 | 3/1993 | McCalley et al. . |
| 5,236,199 | 8/1993 | Thompson, Jr. ...................... 273/439 |
| 5,262,860 | 11/1993 | Fitzpatrick et al. ................... 358/142 |
| 5,450,490 | 9/1995 | Jensen et al. ......................... 348/1 |
| 5,508,731 | 4/1996 | Kohorn ............................... 348/1 |

*Primary Examiner*—John K. Peng
*Assistant Examiner*—Chris Grant
*Attorney, Agent, or Firm*—Jay H. Maioli

[57] ABSTRACT

A two-way broadcasting system and method by which the amount of accesses from the reception side can be controlled with certainty by the broadcasting side and a receiving apparatus for use with the method wherein, information of a reply to a question from a broadcasting side is transmitted from a reception side to the broadcasting side by way of a telephone line. Each receiving apparatus on the reception side has individual identification information, and the broadcasting side broadcasts information regarding a reply destination and telephone call origination limiting information for limiting transmission of the information of a reply in a multiplexed condition with a broadcasting signal from the broadcasting side. On the reception side, transmission of the information of a reply to the reply destination is inhibited when the identification information peculiar to a receiving apparatus on the reception side satisfies a condition provided by the telephone call origination limiting information for inhibiting a telephone call origination of a reply to the reply destination.

17 Claims, 11 Drawing Sheets

RULES FOR DTMF SIGNAL WITH TELEPHONE LINE

| ITEM | ALLOWABLE RANGE |
|---|---|
| SIGNAL SENDING OUT TIME | 50 msec OR MORE |
| MINIMUM PAUSE (MINIMUM VALUE OF PAUSE BETWEEN ADJACENT SIGNALS) | 30 msec OR MORE |
| PERIOD (SIGNAL SENDING OUT TIME + MINIMUM PAUSE) | 120 msec OR MORE |

TWO-WAY BROADCASTING AND RECEIVING SYSTEM WITH TIME LIMIT AND/OR LIMIT DATA

FIELD OF THE INVENTION

This invention relates to a two-way broadcasting method suitable for responding by way of a telephone line and a receiver apparatus for use with the two-way broadcasting method as well as a two-way broadcasting method wherein the broadcasting station side provides a two-way program, or including information regarding a reply destination whereas the receiver side transmits response information of a user to the two-way program to the reply destination by way of a telephone line and a two-way broadcast receiving apparatus for use with the two-way broadcasting method.

BACKGROUND OF THE INVENTION

In a telephone network at present, if accesses occur in a concentrated manner at once upon a certain local area, then an overcrowded condition of telephone lines occurs, resulting in failure or difficulty in connection of a telephone call. The overcrowded condition of telephone lines occurs when telephone calls and requests for a telephone call occur in such a concentrated condition upon particular telephone lines that they exceed the processing capacity of the telephone lines. For example, it frequently occurs that telephone calls to or from a district in which a disaster such as an earthquake has occurred are not connected or connected seldomly. This arises not because a telephone network or an equipment of a central office has been destroyed by the disaster but because telephone calls for inquiring after safety of inhabitants in the district in which the disaster has occurred, occur in a concentrated manner at once from other districts or telephone calls from inhabitants in the district for notifying safety of them to the other districts occur in a concentrated manner at once.

In order to eliminate such an overcrowded condition of telephone lines, for example, a company which accepts reservations of tickets or sells tickets using telephone lines conventionally takes such a countermeasure as to prepare an equipment almost corresponding to a central office of a telephone system. By the way, a participation show accessed by way of telephone lines is held by television broadcasting or radio broadcasting. Such participation show is broadcast, for example, as a television shopping program, a questionnairing program or a participation type quiz program. In the participation shown, the broadcasting side announces a telephone number for reception of a response or displays such telephone number in a superimposed condition on a screen for a suitable period of time to inform a destination for a response to the receivers whereas a receiver responds by way of a telephone call or facsimile.

However, a participation show of the type described above has a problem in that, as the appealing degree of the program increases, the number of accesses of telephone lines of receivers increases so that the telephone lines may be overcrowded. In particular, telephone calls and requests for a telephone call occur in such a concentrated manner upon particular telephone lines that they exceed the processing capacity of the telephone lines, resulting in failure or difficulty in connection of telephone calls.

For example, in shopping by way of television, a large number of subscribers or viewers can participate as purchasers of commodities, and accordingly, a large number of articles can be sold. However, when some commodity is appealing in that there is some limitation in quantity of commodities to be sold or the price is very low and a large number of subscribers want to purchase the commodity, a large number of accesses from subscribers who want to purchase the commodity may be received so that the telephone lines to be used for proposals for purchase may be overcrowded.

In such shopping by way of television or the like, responses from subscribers are received in a concentrated condition immediately after starting of reception of responses and immediately before ending of reception of responses as seen in FIG. 12, and there is a tendency in that the telephone lines are crowded or overcrowded at such concentrated time zone. This occurs since subscribers who want to have a proposal for purchase accepted promptly originate telephone calls in a concentrated condition in the time zone immediately after starting of acceptance of a response, but subscribers who want to purchase but have been suspended to purchase originate telephone calls in a concentrated condition in the time zone immediately before the reception of a response is ended. On the other hand, in the case of a quiz program which requires fast depression or activation of a switch or the line, that is the first-come, first served type, responses from subscribers occur in a concentrated manner upon a time zone immediately after the time instant of starting of reception of a response as seen in FIG. 13 since they try to transmit a response as early as possible. In contrast, in the case of a quiz program of the deliberation type which requires much deliberation, responses from subscribers occur in a concentrated manner upon another time zone immediately before the time instant of the end of the reception of a response as seen from FIG. 14 since they try to transmit an answer as accurate as possible. In either case, subscribers of the two-way television broadcast are many and unspecific persons, and it is very liable that the telephone lines are so crowded that telephone calls cannot be connected readily or are overcrowded. In such a quiz program as described above, an access answer is accepted in a "first come, first served" fashion or a limit time for reception of a reply is determined. However, with the conventional responding method described above wherein telephone lines are used, if telephone calls and requests for telephone calls occur in such a concentrated manner upon particular telephone lines that they exceed the processing capacity of the telephone lines, telephone calls are not connected quickly, and depending upon a response timing, a later telephone access may be connected earlier, or although a response is originated within the limit time, it may be received by the reply destination but outside the limit time. Or, since a preferential order of telephone calls may be determined on the switching office side due to a local area characteristic, where a conventional method wherein a telephone cell connected first is received is employed, responses from subscribers by way of telephone lines cannot be processed fairly.

While it is a possible countermeasure to provide an equipment corresponding to a central office as in a ticket reservation system described hereinabove, the countermeasure not only requires a high cost but also may cause, in the case of a highly-rated program, a crowded or overcrowded condition of telephone lines due to concentration of responses. In order to eliminate the problem of an overcrowded condition of telephone lines, the broadcasting station side often designates, for example, the digit of the last figure for telephone numbers of subscribers to request restriction of telephone cell origination in order to limit participation of subscribers.

Since the request, however, relies upon the good intentions of subscribers, it does not have an absolute effect and does not disable accessing of a subscriber whose telephone number is not permitted for participation.

By the way, an overcrowded condition of telephone lines is caused since a load is applied not only where telephone lines are actually connected but also where telephone lines are being connected. In particular, if a telephone receiver or earphone is picked up into an off-hook condition, the capacity for one telephone line is occupied, and accordingly, for example, if telephone receivers of all telephone sets in a district controlled by a certain central office are picked up at a time, the telephone lines are put into an overcrowded condition. Such an overcrowded condition may occur when utilization of telephone sets in a certain district occurs suddenly due to, for example, the occurrence of a local disaster or the like. However, it is considered that, in a participation show, the problem of an overcrowded condition seldom occurs with a central office on a telephone call origination side, that is, on a subscriber side, unless the program rating is particularly high. In contrast, it is considered that, in the case of a broadcasting program of the participation type, the problem occurs with a central office which controls telephone lines on the broadcasting station side which is the response reception side. In particular, there is a problem in that, even if telephone lines are not connected actually, a large number of requests for use of telephone lines to be connected are made in a concentrated condition upon the telephone lines of a single central office, and even if the broadcasting station itself does not receive telephone calls, application of a load to the telephone lines cannot be prevented unless origination of telephone calls from subscribers is restricted.

SUMMARY OF THE INVENTION

It is an object of the present invention to provide a two-way broadcasting method by which the amount of accesses from the reception side can be controlled with certainty by the broadcasting side and a receiving apparatus for use with the two-way broadcasting method.

It is another object of the present invention to provide a two-way broadcasting method which can prevent a crowded or overcrowded condition of telephone lines caused by transmission of responses from subscribers of a two-way program and a receiving apparatus for use with the two-way broadcasting method.

It is a further object of the present invention to provide a two-way broadcasting method which allows fair processing of responses from subscribers of a two-way program and a receiving apparatus for use with the two-way broadcasting method.

A multiplex broadcast system is shown, for example, in U.S. application Ser. No. 08/344,757 by Hitoshi Yoshinobu, which was filed on Nov. 23, 1994, the disclosure of which is hereby incorporated by reference.

In order to attain the objects described above, according to an aspect of the present invention, there is provided a two-way broadcasting system and method wherein information representing a reply(reply data) to a question from a broadcasting side is transmitted from a reception side to a broadcasting side by way of a telephone line, wherein each receiving apparatus on the reception side has individual identification information, or identification data, associated therewith. The broadcasting side broadcasts information representing a specified reply destination (destination data) and telephone call origination limiting information (limit data) for limiting transmission of reply (data), in a multiplexed condition with a broadcasting signal from the broadcasting side. On the reception side, transmission of the information of a reply (reply data) to the reply destination is inhibited when the identification information peculiar to (associated with) a receiving apparatus on the reception side satisfies a condition provided by the telephone call origination limiting information (limit data) for inhibiting a telephone call origination and transmission of reply data to the specified reply destination.

With the two-way broadcasting method, only those receiving apparatus which do not satisfy the condition provided by the telephone call origination limiting information are enabled or allowed to access the specified reply destination to transmit reply data there to. Consequently, the amount of accesses from the reception side can be controlled with by way of the telephone call origination limiting information by the broadcasting side. This destination data and limit data can be transmitted as sub-broadcasting information associated with a main broadcast signal.

Preferably, sub broadcasting information relating to a program such as data for accessing to the two-way broadcast or data for reservation of the program is transmitted using a DTMF signal within an audio signal band and is broadcast in a multiplexed condition with a main broadcasting audio signal. In this instance, on the reception side, the sub broadcasting information can be received and decoded readily using a DTMF decoder. Preferably, on the reception side, the sub broadcasting information is stored, after decoding, into storage means. Where the sub broadcasting information is stored into storage means, it is unnecessary, for example, to take notes of an access number, for example a telephone number, to a participation show, which is convenient to the user of the receiving apparatus of the reception side.

On the broadcasting side, an encoder on the market can be used as an encoder for a DTMF signal and may be used to mix a DTMF signal with a main broadcasting audio signal. Accordingly, the burden to the broadcasting side is light compared with that in the character multiplex broadcasting system. On the other hand, also on the reception side, a DTMF signal can be extracted from a demultiplexed signal of an audio demultiplexer using a DTMF decoder, and also the receiving apparatus can be constructed at a low cost. Besides, since a DTMF signal is decoded from an audio signal, a reception decoder need not be changed depending upon the broadcasting method as in the case of the character multiplex broadcasting system.

Where decoded sub broadcasting information is stored into storage means, the thus stored sub broadcasting information can be used for an automatic response (automatic dialing) to a two-way program or for reservation of a program.

The identification information (identification data) associated with each receiving apparatus on the reception side may be a product model number, or serial number of the receiving apparatus; or it may be a telephone number associated with a user of the receiving apparatus.

Where the broadcasting signal is a main audio signal, the information regarding the reply destination and the telephone call origination limiting information may be broadcast in the form of a multi-frequency signal, which includes a combination of a plurality of frequencies selected one by one from a plurality of frequency groups in an audio signal band, in a multiplexed condition with the main audio signal. According to another aspect of the present invention, there is provided a two-way broadcast receiving apparatus which comprises use input means for inputting command information which may include a reply to a question or the like (reply data) from a broadcasting side, transmitting means for transmitting the inputted reply information (reply data) to the broadcasting side by way of a telephone line, reproduction means for reproducing (or extracting) information regarding a reply destination (destination data) multiplexed with a reception signal, or broadcast signal, and telephone call origination limiting information (limit data) multiplexed with the reception signal for limiting transmission of the reply information, storage means for storing the information regarding the reply destination and the telephone call origination limiting information reproduced by the reproduction means, holding, or storage, means holding, or storing, identification information (identification data) peculiar to, or associated with, the receiving apparatus, a discrimination means, or comparator, for comparing the telephone call origination limiting information and the identification information peculiar to the receiving apparatus with each other to discriminate whether or not a telephone call origination for the reply from the receiving apparatus is permitted, and means for inhibiting, when the result of discrimination by the discrimination means proves that a telephone call origination from the receiving apparatus is not permitted, transmission of the reply information to the reply destination.

Since the two-way broadcast receiving apparatus has the construction described above, the two-way broadcasting method of the present invention can be executed on the two-way broadcast receiving apparatus.

The identification information peculiar to the receiving apparatus may be a product number of the receiving apparatus or a telephone number of a receiving user.

According to a further aspect of the present invention, there is provided a two-way broadcasting method wherein a two-way broadcast including information regarding a reply destination is provided from a broadcasting station side, and information of responses of users to the two-way program is transmitted from a reception side to the reply destination by way of telephone lines, wherein each receiving apparatus of the reception side has identification information peculiar thereto, and when a responding operation to the two-way program is performed by a user of a receiving apparatus of the reception side, a transmission time instant is set in accordance with the identification information and the response information is transmitted to the reply destination at the thus set transmission time instant.

In the two-way broadcasting method, when a user of a receiving apparatus performs an operation to respond to a two-way program, a transmission time instant different from the time instant at which the responding operation is performed is set in accordance with identification information peculiar to the receiving apparatus, and the response information is transmitted at the transmission time.

Generally, identification information peculiar to a receiving apparatus is random information and also users who operate to respond perform their operations at random. Consequently, transmission times set in accordance with such random identification information are not concentrated but dispersed. Consequently, an otherwise possible crowded or overcrowded condition of telephone lines can be prevented. In particular, when many and unspecified subscribers intend to transmit, in response to a request for a response provided to many and unspecified subscribers by a broadcasting program as in shopping by way of television or two-way broadcasting, response information by way of telephone lines, transmissions of such response information can be dispersed without being concentrated temporarily.

This can be achieved by way of a two-way broadcasting method in which transmission of response information is not performed simultaneously with a responding operation but the transmission time instant for the response information is made different from the time instance of the responding operation so that transmissions of response information from many and unspecified subscribers may be dispersed. Consequently, the load applied to telephone lines is reduced to prevent an overcrowded condition of the telephone lines.

Preferably, the response information to be transmitted to the reply destination includes information regarding a point of time at which the responding operation is performed so that the point of time of an actual responding operation can be identified accurately by the reply destination, and consequently, transmissions of responses, which are otherwise concentrated in a two-way broadcast with which the responding operation time is critical as in a quiz program of the "first come, first served" type, can be dispersed and the reply destination can process such response information fairly.

The two-way broadcasting method may be constructed such that, upon broadcasting of the two-way program, the broadcasting station side broadcasts the information regarding the reply destination and the information regarding a response including a limit time to responses from users in a multiplexed condition with a broadcasting signal, and on the reception side, when a responding operation to the two-way broadcast is performed within the response limit time by a user of a receiving apparatus, a transmission time instant is set within a time range including a time outside the limit time in accordance with the identification information and then response information including information regarding a point of time at which the responding operation is performed is transmitted to the reply destination at the thus set transmission time instant. With the two-way broadcasting method, when there is a limit time set for responses, transmissions of responses which are concentrated immediately prior to a limit time ending time instant are dispersed also to a time after the end of the limit time. Accordingly, transmissions of responses which are concentrated upon a short time zone immediately prior to the limit time ending time instant can be dispersed over a longer interval of time, and accordingly, the dispersion effect is high.

According to a still further aspect of the present invention, there is provided a two-way broadcast receiving apparatus which transmits a response of a user of the receiving apparatus to a two-way program provided from a broadcasting station side is transmitted to a predetermined reply destination by way of a telephone line, comprising inputting means for inputting information of a response to the two-way program, transmission means for transmitting the thus inputted response information to the reply destination of the broadcasting station side by way of a telephone line, a time circuit for providing time instant information, storage means for storing identification information allocated to the receiving apparatus, and transmission time setting means for setting a time instant at which the response information is to be transmitted in accordance with the time instant information from the time circuit and the identification information, the response information being transmitted to the reply destination by the transmission means when the time instant set by the transmission time setting means comes.

Preferably, the two-way broadcast receiving apparatus further comprises means for inserting information into the response information regarding a point of time at which the responding operation is performed into the response information.

Preferably, the two-way broadcast receiving apparatus further comprises extraction means for extracting limit time information of responses to the two-way program multiplexed in a broadcasting signal, means for storing the thus extracted limit time information, means for inserting information regarding a point of time at which the responding operation is performed into the response information, and discrimination means for discriminating from the time information from the time circuit whether or not the time instant at which the responding operation is performed is within a predetermined time prior to a response ending time instant which is determined from the limit time to responses, the transmission time setting means setting, when the result of discrimination from the discrimination means proves that the time instant at which the responding operation is performed is within the predetermined time prior to the response ending time instant, a transmission time instant for the response information within a predetermined time after the response ending time instant. Since the two-way broadcast receiving apparatus has the construction described above, the two-way broadcasting method of the present invention can be executed with certainty on the two-way broadcast receiving apparatus.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Before a two-way broadcasting method and a receiving apparatus for use with the two-way broadcasting method according to the present invention are described, a DTMF (Dual Tone Multi-Frequency) signal which is used to transmit sub broadcasting information such as information for a response to be sent to the subscriber side in a two-way program will be described first.

In particular, the broadcasting station side constructs information relating to a program as sub broadcasting information into a signal of the DTMF signal form, multiplexes (mixes) the signal with a main broadcasting audio signal and broadcasts the multiplexed signal. On the other hand, the subscriber side demultiplexes the DTMF signal from the received broadcasting audio signal, decodes the DTMF signal to reproduce the information relating to a program, stores the information into a memory and utilizes the information in telephone communication with a service station such as the broadcasting station. The DTMF signal will be described with reference to FIGS. 2 and 3. DTMF Signal The DTMF signal system is an audio band signal system wherein two tones of a group (low group) of low frequencies and another group (high group) of high frequencies are sent simultaneously. Each of the groups of low frequencies and high frequencies includes a tone of four audio band frequencies which have no articulation relationship between any two of them.

In the DTMF signal system, the four frequencies of the low group are, for example, 697 Hz, 770 Hz, 852 Hz and 941 Hz, and the four frequencies of the high group are, for example, 1,209 Hz, 1,336 Hz, 1,477 Hz and 1,633 Hz. The frequencies of the low group and the high group are combined in a one-by-one relationship to obtain different DTMF signals of 16 different combinations (each of such DTMF signals will be hereinafter referred to as function signal), and the DTMF signals are allocated to push-buttons "0" to "D" disposed in four rows and four columns of a telephone set as seen in FIG. 2.

In telephone communications, only 12 of the function signals of the totaling 16 combinations for a DTMF signal are generally used for a signal of a subscriber's address (telephone number). In particular, the function signals of the 12 combinations correspond to the numerals "0" to "9", which are used for ten keys of a telephone set, and the symbols "*" and "#". The function signals corresponding to the characters "A", "B", "C" and "D" indicated by broken lines in FIG. 2 are not universally used in Japan, but are used only for data transmission which makes use of push-button (PB) dialing.

Figures 2, 3:
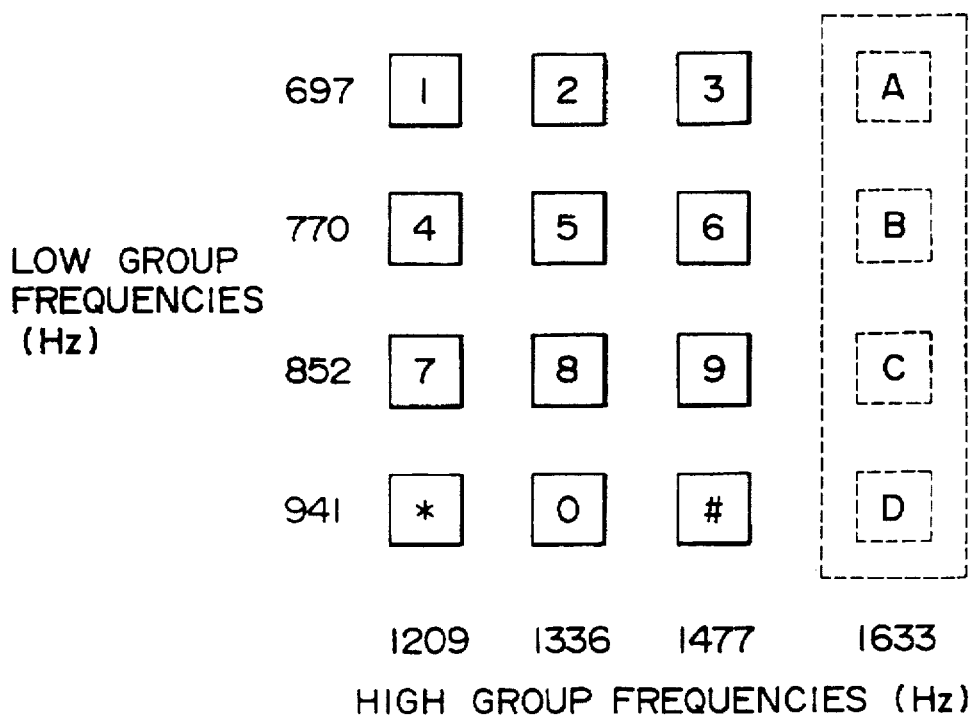
FIG. 2 is a diagrammatic view illustrating a DTMF signal used in the two-way broadcasting method of the present invention.
FIG. 3 is a table illustrating criteria for sending out conditions of a DTMF signal.

When a telephone line is to be selected in accordance with a telephone number using such DTMF signal, the sending out conditions are prescribed as seen in FIG. 3.

Due to a combinations of two frequencies and the sending out conditions described above, any DTMF signal is seldom produced in nature and can be distinguished definitely from natural sound such as a voice of a human being. Accordingly, the DTMF signal can be broadcast in a multiplexed (mixed) condition with an ordinary broadcasting audio signal and can be demultiplexed comparatively readily on the reception side. Incidentally, the DTMF signal is utilized also in a multi-function telephone and can be used, in response to operations of push-buttons of a telephone set of the push-button type from a remote location, to reproduce a message recorded in absence by a home telephone answering machine, record or reproduce a response message recorded in absence or erase a recorded message.

In the embodiment of the present invention described below, on the transmission side, that is, on the broadcasting station side, among the function signals signifying "A", "B", "C" and "D" which are not used for selection of a PB telephone line as described above, the function signals of "A", "B" and "C" are used for transmission staffing information for sub broadcasting information while the function signal of "D" is used for transmission ending information upon transmission of sub broadcasting information.

Since three different kinds of transmission staffing information are provided, in the embodiment described below, three different kinds of sub broadcasting information can be transmitted. In particular, each of the three kinds of sub broadcasting information is delineated, when broadcast, by one of the function signals of "A", "B" and "C" and the function signal "D".

For example, information regarding a response access to a two-way program, for example, sub broadcasting information such as a telephone number (reception telephone number) of a reply access destination and a transfer rate, is transmitted between the function signal of "A" as transmission starting information and the function signal of "D" as transmission ending information. Further, for example, sub broadcasting information regarding environmental setting such as response limiting information for the responding side and setting of the present time instant is broadcast in a multiplexed condition as a signal interposed between the function signal of "B" and the function signal of "D", and information regarding clearing of reception data is broadcast in a multiplexed condition as a signal interposed between the function signal of "C" and the function signal of "D".

Then, on the subscriber side, numerical and/or symbol data interposed between one of the function signals "A", "B" and "C" as transmission starting information and the function signal of "D" as broadcasting ending information are regarded as a sub broadcasting data train (information set) and are stored distinctly into a predetermined different storage area of a memory as hereinafter described.

For example, when accessing for 120 minutes at the transfer rate of 300 bps to a reception telephone number of 0990-1234-1234 is to be permitted to telephone subscribers whose interactive television specification version is 00, as information regarding a response access, sub broadcasting information of such a data train constituted from different function signals for a DTMF signal as

00#120#0990*1234*1234 is transmitted in a multiplexed condition with a main broadcasting audio signal in an interposed relationship between the function signal of "A" and the function signal of "D". Of the data train here, the first "00" represents that the interactive television specification version is 00 (transfer rate: 300 bps), and the numeric data following the symbol #" at the second occurrence represents the reception telephone number.

On the other hand, when it is tried to permit subscribers whose interactive television specification version is 01 to access to a telephone number 0990-1234-1235 for 60 minutes at a transfer rate of 1,200 bps, such a data train constituted from different function signals for a DTMF signal as

01#060#0990*1234*1235 is sent out in a multiplexed condition with a main broadcasting audio signal in an interposed relationship between the function signal of "A" and the function signal of "D". Of the data train here, the first "01" represents that the interactive television specification version is 01 (transfer rate: 1,200 bps), and the numeric data following the symbol "#" at the second occurrence represents the reception telephone number.

It is to be noted that, in such a data train regarding a response access as described above, the symbol "#" serves as a separator (for separating different data from each other), and the symbol "*" represents a pause.

For the response limiting information of the information regarding environmental setting, identification information set for each subscriber is set. As such identification number of a subscriber, a telephone number of a telephone set connected to a modem is registered in an SRAM as hereinafter described. In this instance, registration of an identification number is performed for each receiving apparatus by its subscriber. Where registration of an identification number is performed by its subscriber in this manner, since the subscriber may not possibly perform registration of the telephone number, preferably an ID (identification) number which is set upon production of the telephone set is utilized as in a satellite broadcasting decoder. In other words, upon shipment of a receiving apparatus from a factory, an identification number is registered into an SRAM or a like element of the receiving apparatus.

Then, when it is intended to limit accessing only to those subscribers having particular identification numbers, for example, when it is intended to permit accessing only to those identification numbers whose last digit is 0, such a data train constituted from several function signals for a DTMF signal as 0#0 is sent out, but when it is intended to permit accessing only to those identification numbers whose last digit is 1, such a data train constituted from several function signals for a DTMF signal as

0#1 is sent out, in a multiplexed condition with a main broadcasting audio signal in an interposed relationship between the function signal of "B" and the function signal of "D". In this instance, the numeral "0" prior to the symbol "#" signifies permission of accessing from subscribers of identification numbers which has a numeral following the symbol "#" as the last digit.

On the other hand, when it is intended to permit accessing only to those identification numbers whose last digit is one of even numbers, such a data train constituted from different function signals for a DTMF signal as

0#0*0#2*0#4*0#6*0#8 is sent out in a multiplexed condition with a main broadcasting audio signal in an interposed relationship between the function signal of "B" and the function signal of "D". Here, the symbol "*" signifies logical ORing.

Further, as time instant information for use for reservation of reception or recording of a broadcasting program, for example, when the present time instant is 7:00, Dec. 15, Tuesday, 1993, such a data train constituted from different function signals for a DTMF signal as

1#1993121520700 is sent out in a multiplexed condition with a main broadcasting audio signal in an interposed relationship between the function signal of "B" and the function signal of On the other hand, for example, when a certain broadcasting program is planned to be broadcast, as viewed from the present point of time, from 7:00 to 7:29 on next Sunday, such a data train constituted from different function signals for a DTMF signal as

10#07000729 is sent out in an interposed relationship between the function signal of "B" and the function signal of "D", and then a next broadcasting program is planned to be broadcast from 12:00 to 14:15 on next Monday, such a data train constituted from different function signals for a DTMF signal as

11#12001415 is sent out in an interposed relationship between the function signal of "B" and the function signal of "D".

It is to be noted that, in such a data train regarding environmental setting as described hereinabove, the symbol "#" serves as a separator, and the symbol "*" represents "logical ORing".

Further, as information regarding clearing of reception data, when the information represents clearing of a limitation in number, such a data train constituted from different function signals for a DTMF signal as

99#0 is sent out in an interposed relationship between the function signal of "C" and the function signal of "D".

Further, when the information represents clearing of a reception telephone number, such a data train constituted from different function signals for a DTMF signal as
99#0
is sent out in an interposed relationship between the function signal of "C" and the function signal of "D".

Where the function signals of "A", "B", "C" and "D" which are not used for a selection signal for a telephone line are used for transmission starting information and transmission ending information of sub broadcasting information, even if DTMF sound is transmitted, for example, on a scene on which a telephone call is originated, the DTMF sound will not be confused with information relating to a program. Further, sub broadcasting information can be transmitted and received with certainty.

Subsequently, an embodiment of the present invention wherein a receiving apparatus for a two-way broadcast according to the present invention is applied to a television receiver designed so as to cope with a two-way broadcasting program.

Figure 1:
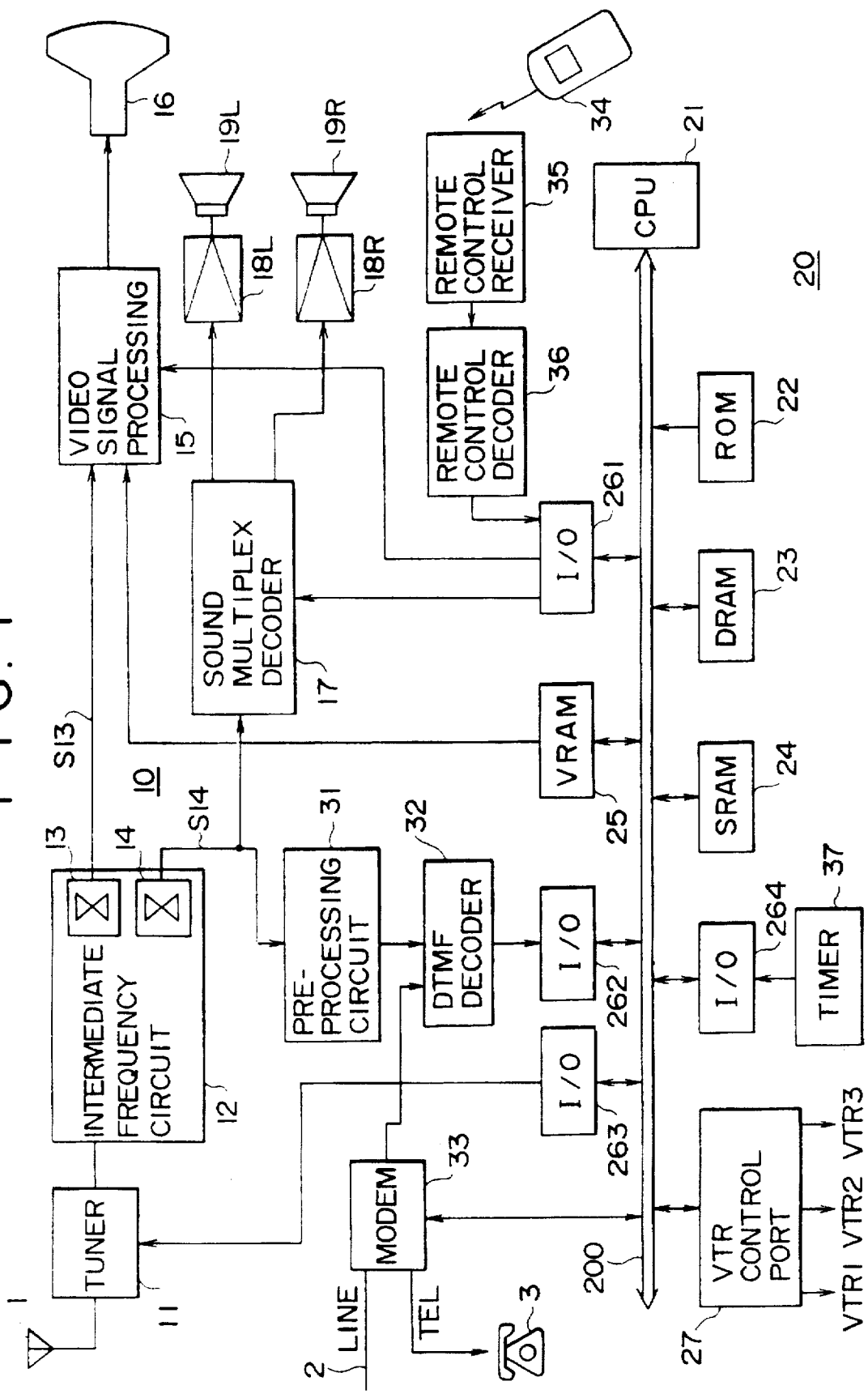
FIG. 1 is a block diagram of a two-way broadcast receiving apparatus to which a two-way broadcasting method according to the present invention is applied showing a first preferred embodiment of the present invention.

The television receiver for a two-way broadcast is schematically shown in FIG. 1. Referring to FIG. 1, the television subscriber shown includes a signal system 10, and a control system 20 for controlling the signal system 10. Broadcastradio waves received by an antenna 1 are supplied to a tuner 11. A channel selection signal is supplied from the control system 20 to the tuner 11, and a broadcasting signal of the desired channel is converted into an intermediate frequency signal by the tuner 11. The intermediate frequency signal is supplied to an intermediate frequency circuit 12. The intermediate frequency circuit 12 includes a video demodulator 13 and an audio demodulator 14, by which a video signal and an audio signal are demodulated, respectively. The video signal S13 from the video demodulator 13 is supplied by way of a video signal processing circuit 15 to a television picture tube 16. The audio signal S14 from the audio demodulator 14 is supplied to a sound multiplex decoder 17, by which two-language signals or stereo signals SL and SR are decoded. Then, the signals SL and SR are supplied to a pair of left and right loudspeakers 19L and 19R by way of a pair of amplifiers 18L and 18R, respectively.

The audio signal S14 from the audio demodulator 14 is supplied to a DTMF decoder 32 by way of a pre-processing circuit 31. The DTMF decoder 32 normally searches for a DTMF signal in an input signal inputted thereto, and when a DTMF signal is detected, the DTMF decoder 32 decodes the DTMF signal to detect which function signal the DTMF signal is. In particular, the DTMF signal is decoded into any of the numerals of "0" to "9" and "#", "*" and "A" to "D". The thus decoded data are supplied to the control system 20.

In the present embodiment, a DTMF decoder which is widely available on the market is employed as the DTMF decoder 32. The pre-processing circuit 31 is provided for performing pre-processing to allow decoding of a DTMF signal with a higher degree of accuracy even if a DTMF decoder on the market is employed as the DTMF decoder 32 in this manner. In particular, the pre-processing circuit 31 removes, from the audio signal S14, frequency components other than the DTMF signal so that an input signal to the DTMF decoder 32 may be a signal which allows use of a DTMF decoder on the market, and is constituted from a filter circuit.

Further, in the present embodiment, a modem (modulator-demodulator apparatus) 33 for data communication is provided in order to cope with a two-way broadcasting program such as a response to a participation type program. A telephone line 2 is connected to a line connection terminal Line of the modem 33, and a telephone set 3 is connected to a telephone terminal Tel of the modem 33. The modem 33 is connected to a system bus 200 of the control system 20. Meanwhile, data from the modem 33 are supplied to the DTMF decoder 32, by which a DTMF signal sent thereto by way of the telephone line 2 is decoded so that it can be fetched into the control system 20.

The control system 20 includes a CPU (central processing unit) 21, a ROM (read only memory) 22, a DRAM (dynamic random access memory) 23, an SRAM (static random access memory) 24 and a video RAM (random access memory) (VRAM) 25, which are individually connected to the system bus 200. The ROM 22 has stored therein a reception fetching processing program for DTMF data, which will be hereinafter described, and various control programs as well as font data and graphic data for use for displaying. The DRAM 23 is used as a working area principally for calculation. Setting information, ID information and so forth of the receiving apparatus itself are stored in the SRAM 24. The video RAM 25 is used to store an image to be displayed.

The control system 20 has I/O pods 261, 262, 263 and 264 and a control pod (VTR control pod) 27 for a video tape recorder. A control signal is supplied to the video signal processing circuit 15 and the sound multiplex decoder 17 via the I/O port 261. Further, for example, an infrared ray remote control signal from a remote control transmitter 34 is received by a remote control receiver 35, and the thus received remote control signal is decoded by a remote control decoding circuit (decoder) 36. The decoded remote control signal is fetched into the control system 20 via the I/O pod 261. Then, the CPU 21 controls, in response to an operation of the remote control transmitter 34 by a user, in accordance with a program of the ROM 22. For example, when the operation for remote control is for channel selection or volume control, channel selection or volume control of the tuner is performed, and font data for use for displaying of necessary characters or symbols are read out from the ROM 22 and transferred to the video RAM 25. Then, the data of the video RAM 25 are supplied to the video signal processing circuit 15, by which they are composed (for example, superimposed) with the video signal S13 so that they are displayed on the screen of the television picture tube 16 for a suitable period of time.

Such data for channel selection or volume control are written, upon every operation, into the non-volatile SRAM 24 so as to realize the last memory function by which the same channel can be enjoyed, when the power source is disconnected once and then connected again, with an equal sound volume to that immediately prior to the disconnection of the power. A channel selection signal is supplied to the tuner 11 via the I/O port 263. Further, in the present embodiment, a notification of an actual time or time data from a timer circuit 37 for timer interruption after a predetermined time are inputted to the control system 20 via the I/O port 264. Meanwhile, the control port 27 for a video tape recorder is constructed so that it can control three video tape recorders VTR1, VTR2 and VTR3. The control system 20 supplies a control signal to a video tape recorder via the control port 27 and fetches a status signal from the video tape recorder to effect desired control of the video tape recorder.

It is to be noted that each of the video tape recorders includes a tuner and an intermediate frequency circuit, which are connected to the antenna 1, for example, by way of a distributor so that they can individually perform reserved recording under the control of the control system 20 as hereinafter described.

Subsequently, reception processing of multiplexed information of the receiving apparatus of the embodiment of FIG. 1 will be described with additional reference to FIGS. 4 and 5. When the power source to the television subscriber is on, a DTMF signal mixed in an audio signal of a program of a channel selected at present is normally supervised using the pre-processing circuit 31 and the DTMF decoder 32. In particular, the CPU 21 searches the output of the DTMF decoder 32 continuously or at a predetermined interval via the I/O port 262 (step 101 ), and when it is detected that a DTMF signal is mixed in the audio signal S14 of the broadcasting program being received at present (step 102), a decode output D32 of the DTMF signal is fetched as a numeral or a symbol as described hereinabove (step 103).

Then, it is checked to determine whether such sending out conditions as described above are satisfied, that is, whether or not the duration of the DTMF signal is longer than 50 msec, whether or not the pause time till a rising edge of a next signal after the DTMF signal disappears is longer than 30 msec or whether or not the sum of the duration of the DTMF signal and the pause time is longer than 120 msec of prescribed time to detect whether or not the detected signal really is a DTMF signal (step 104). Consequently, reception of error data when the reception condition of broadcasting radio waves is bad can be prevented, and erroneous reception can be prevented when same frequency components as those of a DTMF signal are unexpectedly included in ordinary sound.

When it is determined at step 104 that the reception data are not a DTMF signal, the control sequence advances to step 105, at which the temporary storage area of the DRAM 23 is cleared and a storage pointer is initialized, whereafter, the control sequence returns to step 101 to continue the checking of the output of the DTMF decoder 32.

On the contrary when it is determined at step 104 that the reception data are a DTMF signal, the control sequence advances to step 106, at which it is checked whether or not a storage pointer address is within the range of the temporary storage area. Then, when the storage pointer address is not within the temporary storage area, since this is a condition immediately after the power source is connected or is an error condition, the control sequence advances from step 106 to step 107, at which an address of the temporary storage area is initialized into the storage pointer for resetting. Consequently, such a situation that, while the address indicated by the storage pointer remains indefinite, data are written into the DRAM 23 to cause malfunction or software runaway can be prevented. When it is determined at step 106 that the pointer address is within the temporary storage area, or after the address of the temporary storage area is initialized into the pointer at step 107, the control sequence advances to step 108, at which it is discriminated whether the reception data are data of any of the numerals from "0" to "9" or symbol data such as "#" or "*". When the data are determined to be a numeral or a symbol, the control sequence advances from step 108 to step 109, at which it is checked whether or not there is a free area in the temporary storage area.

Then, when the reception data are numeral or symbol data and there is a free area in the temporary storage area, that is, when the pointer indicates an address within the range of the temporary storage area, the control sequence advances to step 110, at which the reception data ("0" to "9", "#" or "*") are stored into the address indicated by the pointer. Thereafter, the control sequence advances to step 111, at which the pointer is updated by one character. Thereafter, the control sequence returns to step 101 to repeat the reception checking of a DTMF signal.

On the contrary when it is determined at step 109 that there is no free area in the temporary storage area, since this signifies a reception error, the control sequence advances to step 112, at which the temporary storage area is cleared and the address of the temporary storage area is initialized into the pointer.

Figure 4:
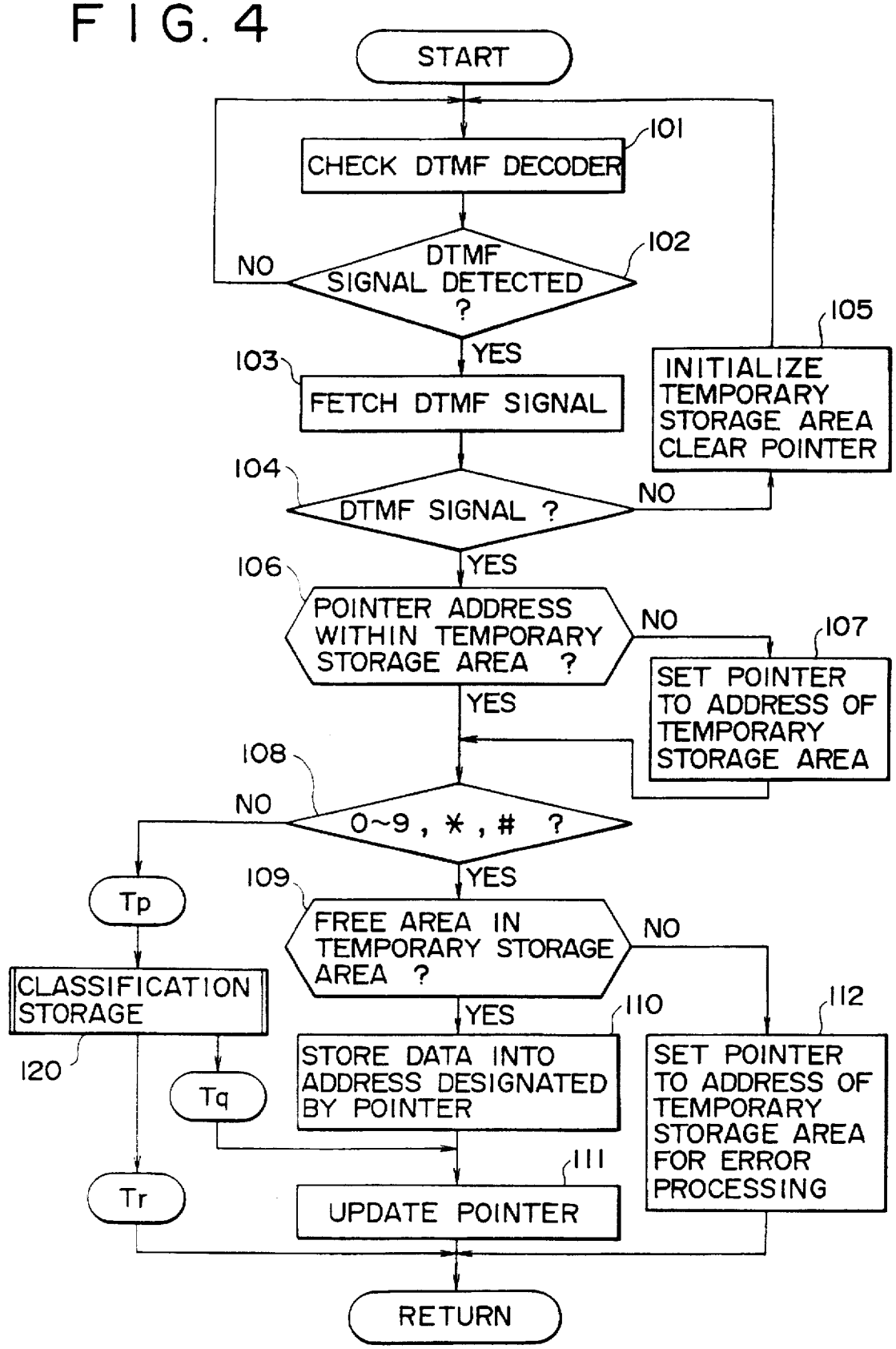
FIG. 4 is a flow chart illustrating general operation of the receiving apparatus of the present invention for receiving sub broadcasting information by way of a DTMF signal.

On the other hand, when it is determined at step 108 that the reception data are not such numeric or symbol data as "0" to "9", "#" or "*", since the reception data are one of the character data "A", "B", "C" and "D" corresponding to the four function signals described above, the control sequence enters a routine 120 for classification storage of FIG. 4. The routine 120 has such contents as illustrated in FIG. 5. Referring now to FIG. 5, the top address of the temporary storage area is placed into the pointer at step 121. Then at steps 122, 123 and 124, the reception data are successively checked to determine which one of the three function signals of "A", "B" and "C" the reception data represent.

Then, when it is determined at step 122 that the reception data represent the function signal of "A", the control sequence advances to step 125, at which "A" is placed into the address designated by the pointer. On the other hand, when it is determined at step 123 that the reception data represent the function signal of "B", the control sequence advances to step 126, at which "B" is placed into the address designated by the pointer. Further, when it is determined at step 124 that the reception data represent the function signal of "C", the control sequence advances to step 127, at which "C" is placed into the address designated by the pointer.

Then, subsequently to step 125, 126 or 127, the control sequence advances to step 111, at which the pointer is updated by one character. Thereafter, the control sequence returns to step 101, at which the reception checking of a DTMF signal is continued.

When it is determined at steps 122 to 124 described above that the reception data are not any one of the three functions of "A", "B" and "C", it is determined that the reception data are the function signal of the remaining character "D", and the data stored into the temporary storage area before then are processed as a single data train (information set).

In particular, since the broadcasting side sends out, upon transmission of a o DTMF signal, one of the function signals of "A", "B" and "C" as a transmission staffing signal, as a result of the processing at steps 125 to 127, one of "A", "B"

and "C" is stored at the top of the temporary storage area. Thus, at next step 128, it is determined which one of the character data of "A", "B" and "C" the top of the temporary storage area is. If the result of determination reveals that the top of the temporary storage area is "A", then the control sequence advances to step 129, at which the data train from the top of the temporary storage area to the last portion indicated by the pointer is stored into a corresponding storage area Ga. On the other hand, if the top of the temporary storage area is "B", the control sequence advances to step 130, at which the data train from the top of the temporary storage area to the last portion indicated by the pointer is stored into a corresponding storage area Gb. Further, if the top of the temporary storage area is "C", then the control sequence advances to step 131, at which the data train from the top of the temporary storage area to the last portion indicated by the pointer is stored into a corresponding storage area Gc. The storage areas Ga, Gb and Gc are set in the DRAM 23 or the SRAM 24 as hereinafter described.

Subsequently, the control sequence advances to step 132, at which evaluation and analysis of the received data train are performed, and when the information stored in the storage area Ga, Gb or Gc is a command which must be executed upon reception, processing corresponding to the command such as, for example, clearing of part or all of the received information, setting of the present time instant into the timer or menu display selection processing, is performed. Thereafter, the control sequence returns to step 101, at which the reception checking is repeated.

As described above, in the reception processing of multiplexed data by the receiving apparatus of the present embodiment, an audio signal of a broadcasting program is supervised continuously, and a data train interposed between the function signals of the character data "A" and "D", "B" and "D" or "C" and "D" corresponding to the function signals for a DTMF signal is regarded as a set of information and classified in accordance with the kind of information as described above. Thus, the information is automatically stored into the individual corresponding storage area Ga, Gb or Gc. In this manner, in the receiving apparatus of the present embodiment, reception information can be stored in a classified condition.

For example, when the start of the data train is the function signal of "A", the data train is stored into the storage area Ga as information which relates to a response access to the two-way program; when the start is the function signal of "B", the data train is stored into the storage area Gb as information relating to environmental setting; but when the start is the function signal of "C", then the data train is stored into the storage area Gc as information regarding clearing of reception data.

While temporary information corresponding to a two-way program such as information regarding a response access may be cleared upon reception of a program clearing signal, if the possibility that the channel may have been changed before reception of the clearing signal is taken into consideration, an old number is preferably cleared at a timing at which the power source is disconnected. Accordingly, information regarding a response access may be stored as it is into the DRAM 23. Or in other words, the storage area may be set on the DRAM 23.

On the other hand, information regarding environmental setting includes time instant information for reception reservation or recording reservation of a broadcasting program, and the time instant information of the reserved program must be kept reserved for a comparatively long period of time which may exceed, for example, one week Therefore, such information should be transferred to the non-volatile SRAM 24. Accordingly, in the receiving apparatus of the present embodiment, the storage area Ga, Gb or Gc is set to the volatile DRAM 23 or the non-volatile SRAM 24 depending upon a nature of data to be stored, that is, the condition of whether or not storage for a long period of time is required or whether or not the data may be erased upon disconnection.

Then, upon such response processing of a simplified interactive television system wherein a universal telephone line is utilized for transmission of information in an ascending direction to the center office as described hereinbelow, information necessary for a destination telephone number or communication conditions stored in the storage area Ga of the DRAM 23 can be automatically read out and utilized.

On the other hand, also upon such recording reservation as described hereinbelow, time instant information of a reserved program transferred from the storage area Gb of the DRAM 23 to the SRAM 24 can be utilized automatically.

Figure 6:
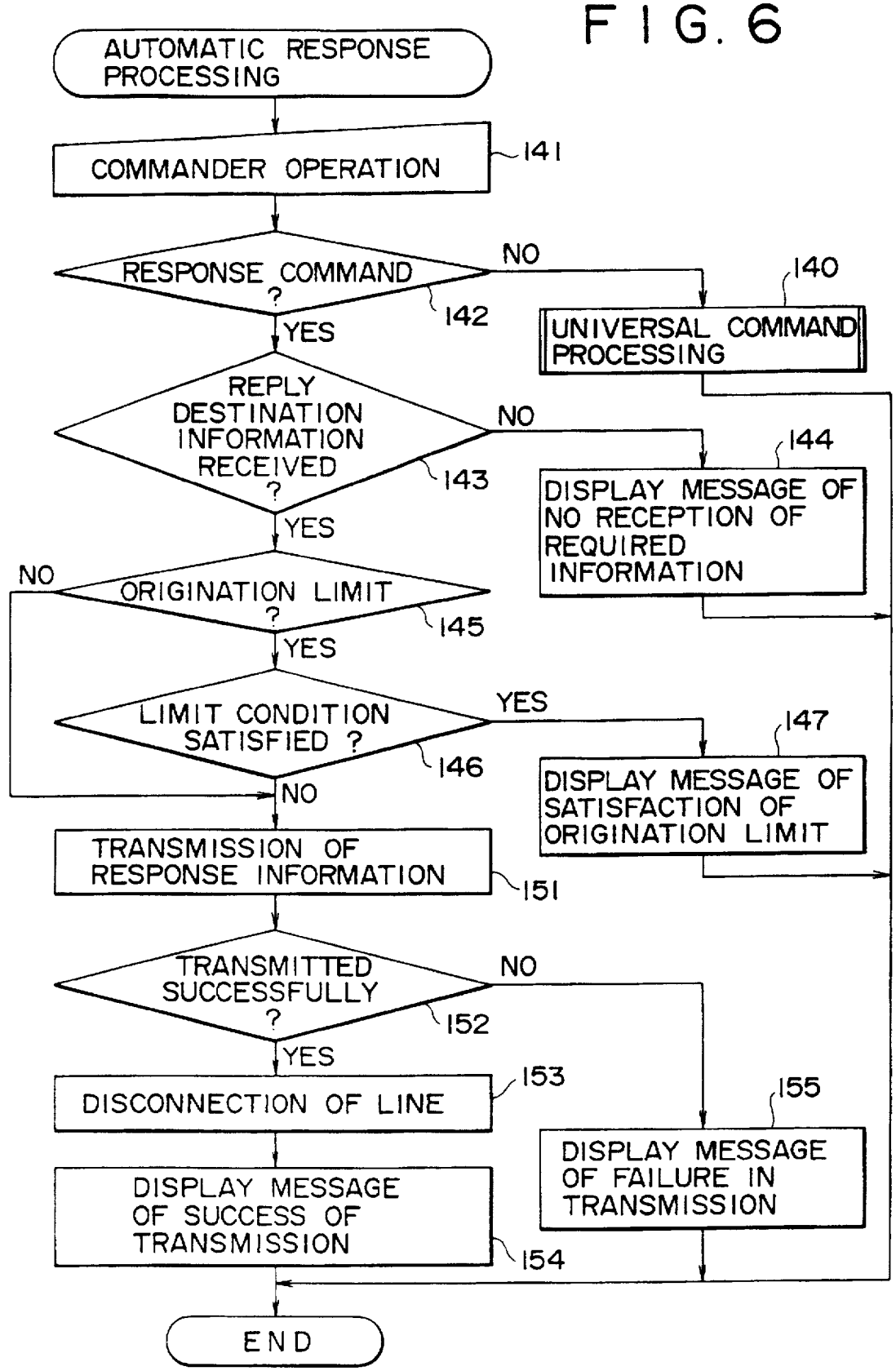
FIG. 6 is a flow chart illustrating an operation of the receiving apparatus of FIG. 1 for responding to a two-way program.

Subsequently, response processing of the receiving apparatus of the first embodiment of FIG. 1 will be described with reference to FIG. 6.

When a subscriber operates the remote control transmitter 34 at step 141, a remote control signal transmitted from the remote control transmission 34 is received by the remote control receiver 35. Then, it is determined at step 142 whether or not the thus received command is a responding command for responding to a program of a two-way broadcast such as, for example, a quiz program of the participation type. When the received command is a universal command such as, for example, changing of a channel, processing corresponding to the command is executed at step 140.

Figure 5:
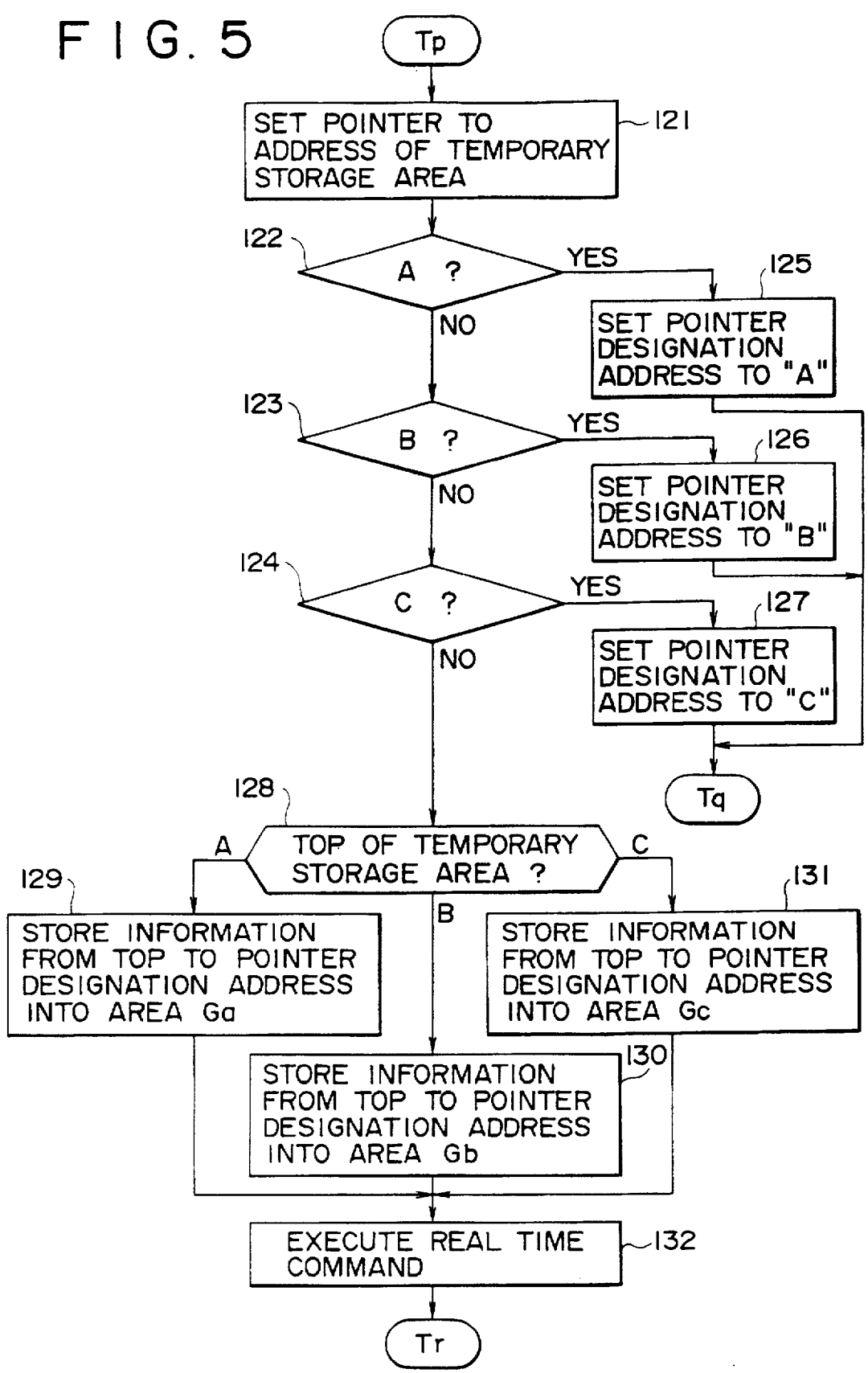
FIG. 5 is a flow chart illustrating details of processing at a certain step of the flow chart of FIG. 4.

On the other hand, when the received command is a responding command, it is determined at step 143 whether or not access information such as a telephone number of a reply destination and a communication rate has been received and stored into the DRAM 23 as a result of such reception processing as illustrated in FIGS. 4 and 5, and if no access information has been received, it is displayed, at step 144, on the screen of the television picture tube 16 for a fixed period of time by way of an icon or message representing an error that no access information has been received.

On the other hand, if reply destination information has been received already at step 143, then it is determined at steps 145 and 146 whether or not there is transmission limiting information received simultaneously and whether or not the subscriber satisfies the limiting condition.

The limiting condition here is set, on the broadcasting station side, by way of such information regarding environmental setting as described hereinabove and limits origination of a telephone call, for example, by designating the last digit of the identification numbers of the subscribers each stored in the SRAM 24 of each receiving apparatus. For example, when it is intended to limit responses so as to permit accessing only to those of subscribers having identification numbers whose last digit is, for example, "0", accessing is permitted to those subscribers having identification numbers which have the last digit of "0" while those subscribers having identification numbers having different last digits are inhibited from originating a telephone call. When the subscriber satisfies such limiting condition and is inhibited from originating a telephone call, a message representing this is displayed for a fixed time on the television picture tube 16 at step 147. Then, when there is no limiting condition or when the subscriber does not satisfy the limiting condition, the identification number of the subscriber is added, at step 151, to the information as a response to the broadcasting program to produce response information, and a communication rate is set in accordance with such response destination information as described above, whereafter the response information is transmitted by way of the modem 33 toward the predetermined telephone number stored in the DRAM 23.

At subsequent step 152, it is determined whether or not the response information has been transmitted successfully, and if the response information has been transmitted successfully, then the telephone line is disconnected at step 153, displaying the message "transmission has been performed" on the screen for certain period at step 154. But if transmission of the response information has failed, a message representing this is displayed on the screen for a fixed period of time at step 155.

It is to be noted that the condition of limiting origination of a telephone call at step 146 may be such that accessing is limited to only one of a plurality of subscribers participating in the program by selecting a particular one ID number. In this instance, suitable data representing participation in the program are transmitted from the subscribers to the broadcasting station side in advance.

Further, by combining the limiting condition just described with such time limit of information regarding a response access as described hereinabove, it is possible to inhibit accessing only for a fixed period of time and then permit accessing.

By limiting the last digit in this manner, the broadcasting side can perform two-way broadcasting readily while it controls the amount of responses from the subscriber side.

In the meantime, on the subscriber side, even if an ineffective responding operation is performed in error while accessing is limited, a telephone call is not originated, and accordingly, no useless load is applied to a telephone line and no useless rental fee for the telephone line is required. Further, the subscriber side can respond readily and with certainty by automatically utilizing access information reproduced from a reception signal.

Further, as response information, an ID number peculiar to an individual subscriber such as SONY-01-23456789 is added to such an answer as "#1", for example, to a question in a quiz program of the participation type.

Consequently, the broadcasting side can recognize from a subscriber of which maker it is accessed, and the information can be utilized as fixed royalty payment information for the fee for a telephone call.

Since, in the present embodiment, information relating to a program is broadcast in the form of a DTMF signal in a multiplexed condition with an audio signal of a program as described above, such an inexpensive circuit as a DTMF subscriber chip, which is formed as a DTMF decoder into an IC and produced in a mass, can be used on the reception side. Consequently, a more inexpensive subscriber than a subscriber which can receive a character multiplex broadcast can be provided.

Further, as distinct from transmission in the form of a character multiplex broadcast, the receiving apparatus can receive various types of broadcasts by means of a same circuit and no influence is had on the conventional broadcasting systems.

Indeed, the transfer rate of information in the receiving apparatus of the present embodiment is approximately 8 characters/second as apparent from the period of a DTMF signal described above and is very low as compared with the transfer rate of information by the character multiplex system. However, since the required information amount is small as described above, the transfer rate need not be placed in question.

Since the present time instant or such time instant information as the time instant regarding reception reservation or recording reservation of a broadcasting program can be broadcast as multiplex broadcast in the form of a DTMF signal as a data train wherein the function signals of "B" and "D" are included as transmission starting information and transmission ending information, respectively, amendment to the time instant of a timer or simplification in operation for reservation of a program can be achieved by making use of the time instant information.

Where, for example, accurate information of the present time instant is transmitted as the time instant information, correction or setting of the present time instant of, for example, the timer circuit 37 or a timer as a time circuit possessed by a video tape recorder itself can be performed readily making use of the accurate time instant information. In particular, when the present time instant information is received, the time count of, for example, the timer circuit 37 may be set automatically to the thus received present time instant.

Further, on the broadcasting station side, simultaneously with announcement broadcasting of a certain program, broadcasting time information of the program is broadcast in the form of a DTMF signal by multiplex broadcast, and on the reception side, when the announcement broadcasting and the broadcasting time information are received, if a reservation button of the remote control transmitter 34 is depressed within a predetermined time, data of a broadcasting starting time instant and a broadcasting ending time instant of the announcement program are automatically stored into the area Gb of the DRAM 23. Then, in the receiving apparatus, the data of the broadcasting starting time instant and the broadcasting ending time instant of the announcement program are transferred to the SRAM 24 and used as recording reservation data.

In this instance, selection channel data of a channel enjoyed then is written into the SRAM 24 so that it is used also as recording reservation data.

Then, when the broadcasting starting time instant of the announcement program comes, a video tape recorder connected to the receiving apparatus via the control port 27 is started by interruption from the timer circuit 37 so that recording is started. Then, when the broadcasting ending time instant of the reserved program comes, the video tape recorder stops its operation by interruption from the timer circuit 37 again, thereby ending the reserved recording.

It is to be noted that, in the case of a program reservation, a television subscriber itself starts and stops its operation similarly as described above.

It is to be noted that, while, in the embodiment described above, one of the function signals of "A", "B" and "C" is used as transmission starting information of sub broadcasting information and the function signal of "D" is used as transmission ending information of the sub broadcasting information, any one of the function signals of "A", "B", "C" and "D" may be arbitrarily used as transmission starting signal or transmission ending signal.

Meanwhile, if a predetermined one of the function signals such as, for example, the function signal of "D" is used as transmission ending information and a combination of a plurality of ones of the other function signals of "A", "B" and "C" (an overlap is permitted and a difference in order is taken into consideration) is used as transmission starting information, then the number of classifiable kinds of sub broadcasting information can be increased. Further, also the transmission ending signal may be one of combinations of a plurality of different function signals permitting an overlap and taking a difference in order into consideration.

Further, the transmission starting information and the transmission ending information may each be a particular combination of "0" to "9", "#" and "*". Or each of them may be a combination selected from the numerals and the symbols as well as "A" to "D".

It is to be noted that, while, in the embodiment described above, a main audio signal is broadcast with origination limiting information in the form of a DTMF signal multiplexed therewith, similar effects to those of the embodiment described above can be achieved also by broadcasting the origination limiting information in a multiplexed condition with a video signal in character multiplex broadcasting.

Further, while, in the embodiment described above, the present invention is applied to television broadcasting and a television subscriber, since the present invention resides in that sub broadcasting information such as accessing data or program reservation data of a two-way broadcast is constructed using, for example, a DTMF signal within a comparatively narrow audio band and is broadcast in a multiplexed condition with a main broadcasting audio signal, the present invention can be applied also to AM or FM radio broadcasting and a receiving apparatus for such broadcasting.

Subsequently, a second embodiment of the present invention wherein a receiving apparatus for a two-way television broadcast to which a two-way broadcasting method according to the present invention is applied is applied to a television receiver designed so as to cope with a two-way broadcasting program. In particular, in the present embodiment, the broadcasting station side broadcasts, upon broadcasting of a two-way program, information relating to the two-way program including information of a reply destination or a response limit time as sub broadcasting information in a multiplexed condition with a main broadcasting television signal. On the other hand, the receiver side demultiplexes and reproduces the information relating to a two-way program from a received video signal, stores the information into a memory and utilizes the information for a response to the two-way broadcasting program. In the present embodiment, information relating to a two-way program is multiplexed, in the form of a signal in an audio band such as a DTMF (Dual Tone Multi-Frequency) signal which can be distinguished readily from main broadcasting sound, with a main broadcasting audio signal similarly as in the first embodiment described hereinabove.

In particular, the broadcasting station side constructs information relating to a program as sub broadcasting information into a signal of the DTMF signal form, multiplexes (mixes) the signal with a main broadcasting audio signal and broadcasts the multiplexed signal. On the other hand, the receiver side demultiplexes the DTMF signal from the received broadcasting audio signal, decodes the DTMF signal to reproduce information relating to a program, stores the information into a memory and utilizes the information upon transmission of response information to a reply destination.

Since the DTMF signal is described in detail hereinabove in connection with the first embodiment of the present invention, overlapping description thereof is omitted herein.

Broadcasting of Sub Broadcasting Information

Also broadcasting of sub broadcasting information is performed in a similar manner as in the first embodiment described hereinabove. In particular, on the transmission side, that is, on the broadcasting station side, among the function signals signifying "A", "B", "C" and "D" which are not used for selection of a PB telephone line, the function signals of "A", "B" and "C" are used for transmission starting information for sub broadcasting information while the function signal of "D" is used for transmission ending information upon transmission of sub broadcasting information. Since three different kinds of transmission starting information are provided, three different kinds of sub broadcasting information can be transmitted distinctly. In particular, each of the three kinds of sub broadcasting information is delineated, when broadcast, by one of the function signals of "A", "B" and "C" and the function signal "D".

For example, information regarding a response access to a two-way program, for example, sub broadcasting information such as a telephone number (reception telephone number) of a reply access destination and a transfer rate, is transmitted between the function signal of "A" as transmission starting information and the function signal of "D" as transmission ending information. Further, for example, sub broadcasting information regarding environmental setting such as response limiting information for the responding side and setting of the present time instant is broadcast in a multiplexed condition as a signal interposed between the function signal of "B" and the function signal of "D", and information regarding clearing of reception data is broadcast in a multiplexed condition as a signal interposed between the function signal of "C" and the function signal of "D".

Then, on the receiver side, numerical and/or symbol data interposed between one of the function signals "A", "B" and "C" as transmission starting information and the function signal of "D" as broadcasting ending information are regarded as a sub broadcasting data train (information set) and are stored distinctly into a predetermined different storage area of a memory as hereinafter described.

For example, when accessing for 120 minutes at the transfer rate of 300 bps to a reception telephone number of 0990-1234-1234 as a reply destination of a response is to be permitted to telephone receivers whose interactive television specification version is 00, as information regarding a response access to shopping by way of television, sub broadcasting information of such a data train constituted from different function signals for a DTMF signal as

00#120#0990*1234*1234 is transmitted in a multiplexed condition with a main broadcasting audio signal in an interposed relationship between the function signal of "A" and the function signal of "D". Of the data train here, the first "00" represents that the interactive television specification version is 00 (transfer rate: 300 bps), and the numeric data following the symbol "#" at the second occurrence represents the reception telephone number.

On the other hand, when it is tried to permit receivers whose interactive television specification version is 01 to access to a telephone number 0990-1234-1235 for 1 minute at a transfer rate of 1,200 bps as information regarding a response access to a quiz program of the fast depression type, such a data train constituted from different function signals for a DTMF signal as

01#001#0990*1234*1235 is sent out in a multiplexed condition with a main broadcasting audio signal in an interposed relationship between the function signal of "A" and the function signal of "D". Of the data train here, the first "01" represents that the interactive television specification version is 01 (transfer rate: 1,200 bps), and the numeric data following the symbol "#" at the second occurrence represents the reception telephone number.

It is to be noted that, in such a data train regarding a response access as described above, the symbol "#" serves as a separator (for separating different data from each other), and the symbol "*" represents a pause.

When it is intended to limit accessing only to those receivers having particular telephone numbers (subscriber numbers), for example, when it is intended to permit accessing only to those telephone numbers whose last digit is 0, such a data train constituted from several function signals for a DTMF signal as

0#0 is sent out, but when it is intended to permit accessing only to those telephone numbers whose last digit is 1, such a data train constituted from several function signals for a DTMF signal as

0#1 is sent out, in a multiplexed condition with a main broadcasting audio signal in an interposed relationship between the function signal of "B" and the function signal of "D". In this instance, the numeral "0" prior to the symbol "#" signifies permission of accessing from receivers of telephone numbers which have a digit following the symbol "#" as the last digit. On the other hand, when it is intended to permit accessing only to those telephone numbers whose last digit is one of even numbers, such a data train constituted from different function signals for a DTMF signal as

0#0*0#2*0#4*0#6*0#8 is sent out in a multiplexed condition with a main broadcasting audio signal in an interposed relationship between the function signal of "B" and the function signal of "D". Here, the symbol "*" signifies logical ORing.

Further, as time instant information for reservation of reception or recording of a broadcasting program, for example, when the present time instant is 7:00, Dec. 15, Tuesday, 1993, such a data train constituted from different function signals for a DTMF signal as

1#1993121520700 is sent out in a multiplexed condition with a main broadcasting audio signal in an interposed relationship between the function signal of "B" and the function signal of "D".

On the other hand, when a certain broadcasting program is planned to be broadcast, as viewed from the present point of time, from 7:00 to 7:29 on next Sunday, such a data train constituted from different function signals for a DTMF signal as

10#07000729 is sent out in an interposed relationship between the function signal of "B" and the function signal of "D", and then a next broadcasting program is planned to be broadcast from 12:00 to 14:15 on next Monday, such a data train constituted from different function signals for a DTMF signal as

11#12001415 is sent out in an interposed relationship between the function signal of "B" and the function signal of "D".

It is to be noted that, in such a data train regarding environmental setting as described hereinabove, the symbol "#" serves as a separator, and the symbol "*" represents "logical ORing".

Further, as information regarding clearing of reception data, when the information is for clearing of a limitation in number, such a data train constituted from different function signals for a DTMF signal as

99#0 is sent out in an interposed relationship between the function signal of "C" and the function signal of "D".

Where the function signals of "A", "B", "C" and "D" which are not used for a selection signal for a telephone line are used for transmission starting information and transmission ending information of sub broadcasting information, even if DTMF sound is transmitted, for example, on a scene on which a telephone call is originated, the DTMF sound will not be confused with information relating to a program. Further, sub broadcasting information can be transmitted and received with certainty.

Figure 7:
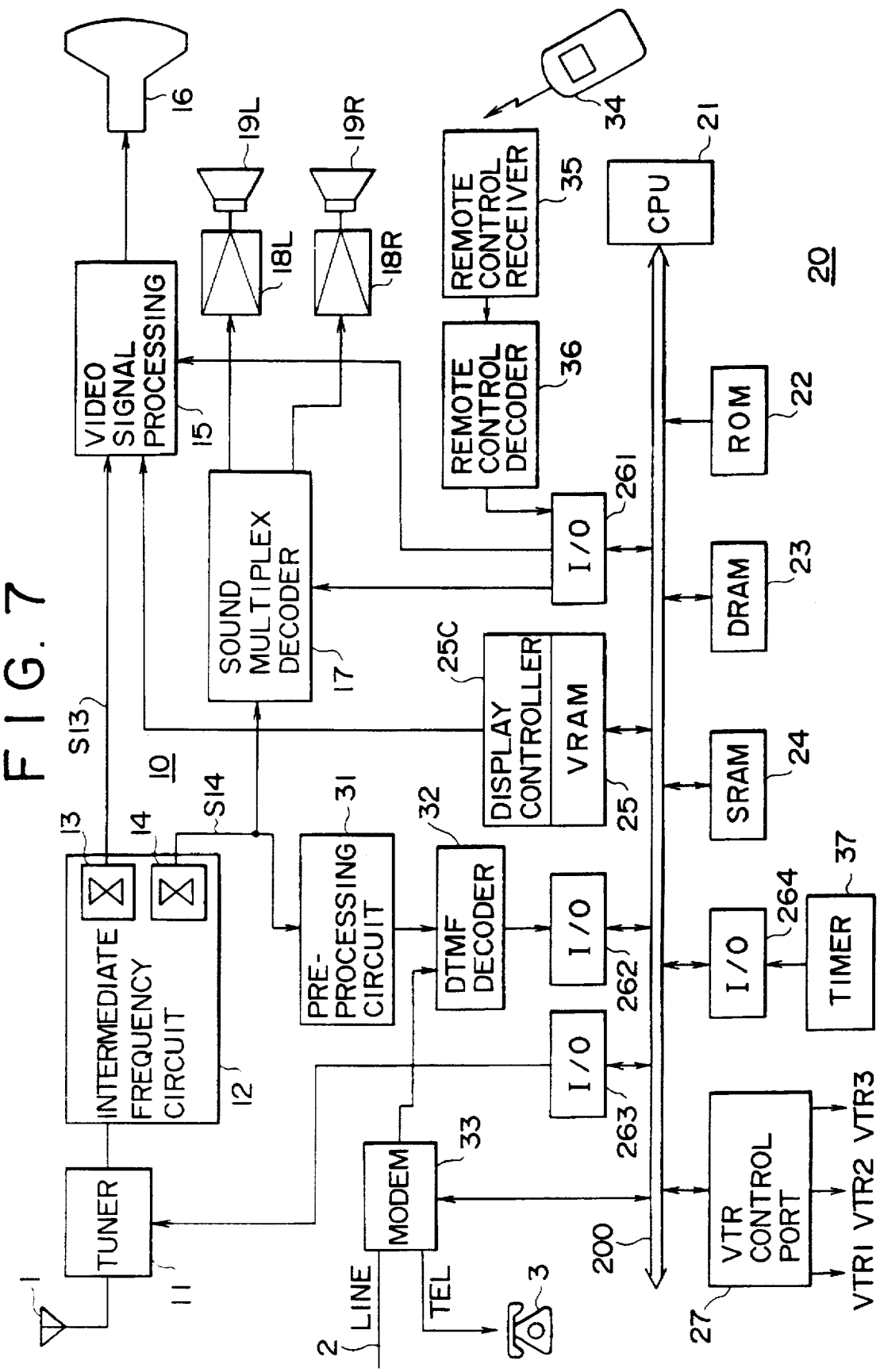
FIG. 7 is a block diagram of another two-way broadcast receiving apparatus to which another two-way broadcasting method according to the present invention is applied showing a second preferred embodiment of the present invention.

FIG. 7 shows a receiving apparatus for a two-way broadcast according to the second preferred embodiment of the present invention. Referring to FIG. 7, the receiving apparatus shown is a modification to the receiving apparatus of the first embodiment described hereinabove with reference to FIG. 1, and overlapping description of common components is omitted herein to avoid redundancy.

The receiving apparatus has identification information of itself. Such identification information is an identification number peculiar to an individual apparatus set upon production of a television receiver which is designed to cope with a two-way broadcasting program, such as, for example, "SONY-00-00000001". A user will register, after purchase of a television receiver designed to cope with a two-way broadcasting program, the identification information of the television receiver and the name, the address, the telephone number and so forth of the user into a data base of a data base center which is a reply destination of a response of a receiver of a two-way television program. In the data base center, the individual information corresponding to the identification information of the television receiver is controlled on the data base. By including the identification information of the receiving apparatus into information of a response to a two-way program, it can be readily identified by the data base center of the reply destination from which a response has been received.

The television receiver of the present embodiment is different from the television receiver of the first embodiment only in that the video RAM 25 includes a display controller 25C. The display controller 25C controls reading and writing of video data from and into the video RAM 25 and converts video data read out from the video RAM 25 into an analog video signal. The analog video signal thus obtained from the display controller 25C is supplied to the video signal processing section 15, by which it is superimposed or switchably composed with a video signal from the intermediate frequency circuit 12 under the control of the video signal processing section 15 from the control section 20.

Further, the control system 20 uses time instant information from the timer circuit 37 to recognize a time instant (responding operation time instant) at which a responding operation is performed and calculate a transmission time instant as hereinafter described.

Figure 8:
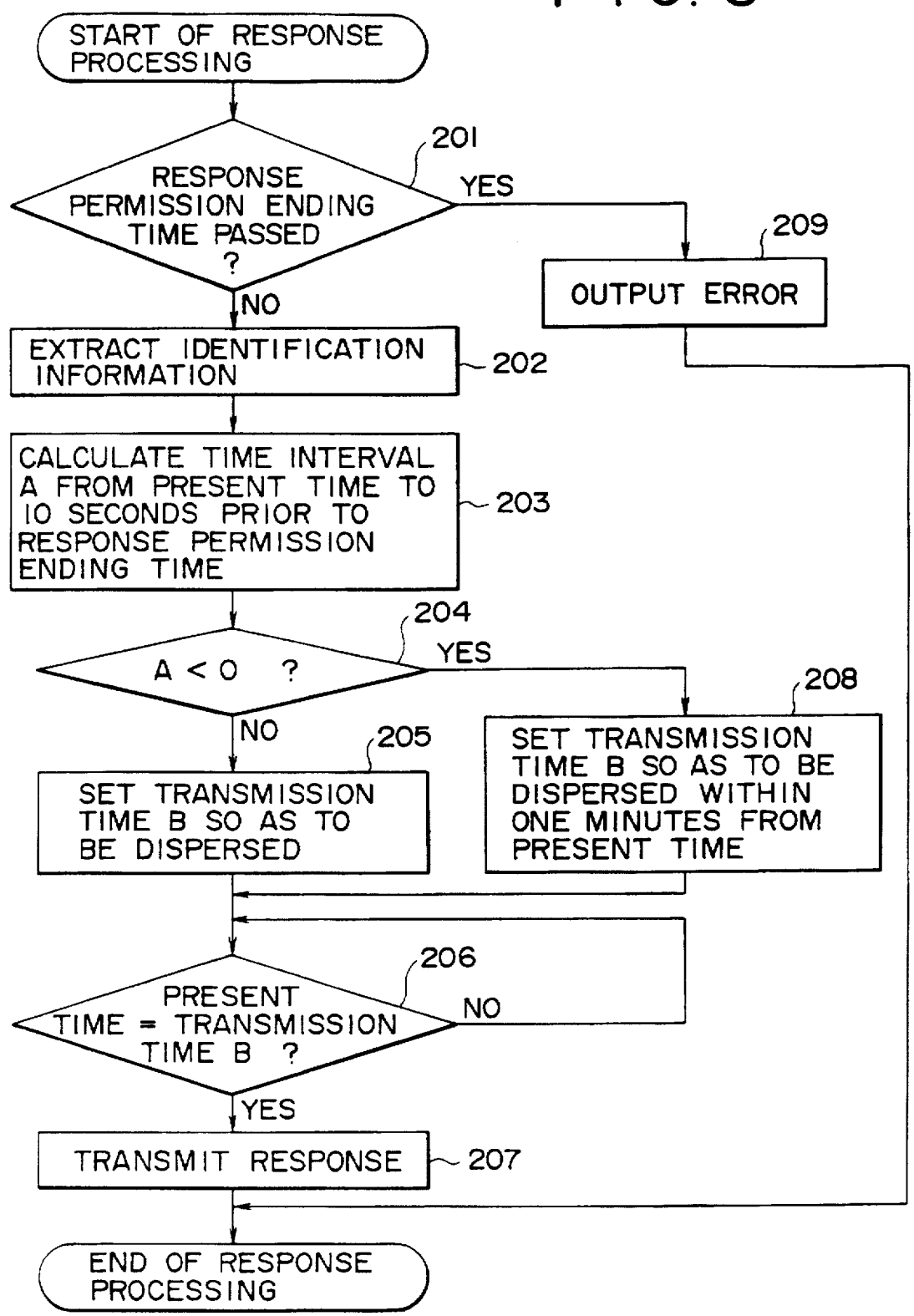
FIG. 8 is a flow chart illustrating processing of the receiving apparatus for dispersing a transmission time instant of response information.
Figure 9:
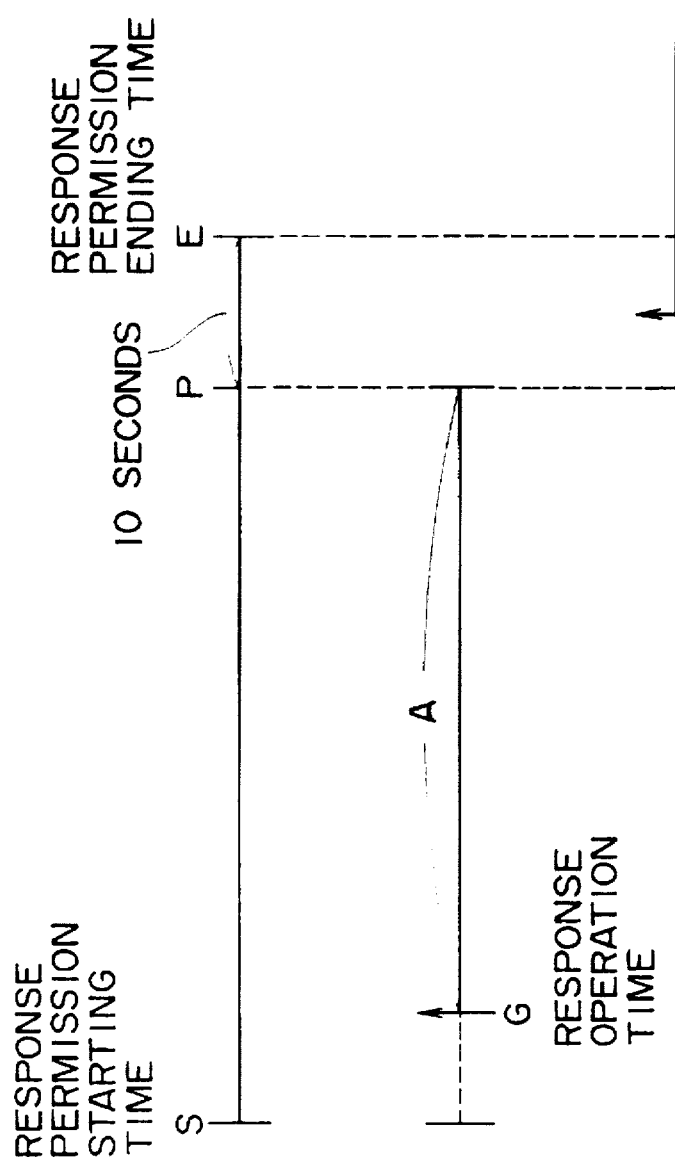
FIG. 9 is a diagram illustrating dispersion of a transmission time instant of response information

Subsequently, dispersion processing for a response transmission time instant of the television receiver of FIG. 7 will be described with reference to FIGS. 8 and 9. FIG. 8 illustrates processing executed principally by the control section 20 of the two-way broadcast receiving apparatus for dispersing the transmission time instant of response information, and FIG. 9 illustrates the relationship between a time instant and transmission of response information.

In the present embodiment, a data train which represents a telephone number of a reply destination, a response permission time and so forth and may include the numerals "0" to "9" and the symbols "*" and "#" is multiplexed (mixed) in the form of a DTMF signal described above with a main broadcasting audio signal and transmitted in the multiplexed condition from the broadcasting station side. In the present embodiment, the response permission time is set as a relative time from the present time instant.

A broadcasting signal in which such DTMF signal is multiplexed is received and selected by the tuner 11. Then, a video signal and an audio signal of the receiver broadcasting signal are demodulated by the video demodulator 13 and the audio demodulator 14 of the intermediate frequency circuit 12. Then, the DTMF signal is extracted from the audio signal from the audio demodulator 14 and decoded into data of a numeral or numerals and a symbol or symbols by the pre-processing circuit 31 and the DTMF decoder 32, respectively, and then fetched into, for example, the DRAM 23 of the control system 20 via the I/O port 262. Then, the telephone number of the reply destination is transferred to and written into and thereafter held in the SRAM 24. Further, a response permission ending time instant is calculated from the response permission time set as a relative time and the present time instant provided from the timer circuit 37 and is written into and thereafter held in the SRAM 24.

The storage of the information regarding the reply destination into the SRAM 24 is performed prior to requesting for a response provided by the broadcasting program, for example, when the broadcasting program is a quiz program, prior to making a question. In other words, writing of the telephone number of the reply destination, the response permission time and the response permission ending time instant into the SRAM 24 is completed prior to making a question of a quiz.

Then, after a question of a quiz is made, for example, in a broadcasting program, a subscriber will operate the remote control transmitter 34 to perform a responding operation such as selection. Thus, the control system detects that a responding operation has been performed, detects a time instant of the responding operation from time instant information from the timer circuit 37 and writes the time instant of the responding operation into the DRAM 23. Then, the control system 20 of the receiving apparatus executes processing for dispersing the transmission time of response information so that transmission of response information may not be performed in a concentrated condition.

In the present embodiment, the processing of dispersing transmissions of responses which occur in a concentrated manner immediately after the staffing time instant of response permission and responses which occur in a concentrated manner immediately before the ending time instant E of response permission is executed in the following manner.

In the present embodiment, it is assumed that, as seen in FIG. 9, concentrated responses immediately before the response permission ending time instant E occur within a time of, for example, approximately 10 seconds prior to the response permission ending time instant. Consequently, in the present embodiment, transmissions of responses from the time instant P 10 seconds prior to the response permission ending time instant E to the response permission ending time instant E are dispersed over a predetermined period of time after the response permission ending time instant E, in the present embodiment, till the time instant O after 50 seconds. Then, responses occurring after the response permission starting time instant before the time instant P are dispersed between the responding operation time instant G and the time instant P.

The processing routine for dispersing transmissions of response information is illustrated in FIG. 8. Referring to FIG. 8, the present routine is executed as the CPU 21 reads out a processing program of the ROM 22 when a responding operation is performed by a user as described above.

First, prior to making a question of a quiz, a response permission ending time instant calculated from a response permission time provided as a DTMF signal is read out, and it is determined at step 201 whether or not the time instant (responding operation time instant) at which the responding operation is performed exceeds the response permission ending time instant.

When it is determined at step 201 that the responding operation time instant exceeds the response permission ending time instant, since transmission of response information to the reply destination side is meaningless, such an error message as, for example, "The response permission time has elapsed." is displayed on the television picture tube 16 or sound is outputted from the loudspeakers 19L and 19R to give a warning to a user that the responding operation is meaningless at step 209. Then, the routine is ended without performing transmission of response information.

On the contrary if it is determined at step 201 that the responding operation time instant does not exceed the response permission ending time instant, the identification information of the receiving apparatus held in the ROM 22 is read out (step 202). The identification information of the receiving apparatus in the present embodiment is, as described hereinabove, an identification number peculiar to the individual apparatus set upon production of the television receiver designed to cope with a two-way broadcasting program. Thereafter, the control sequence advances from step 202 to step 203, at which the present time instant G of the timer circuit 37 when the responding operation is performed with the remote control transmitter 34 by the subscriber is fetched as a responding operation time instant, and the time interval A from the responding operation time instant G to the point P 10 seconds prior to the response permission ending time instant E (refer to FIG. 9) is calculated in accordance with the following expression for calculation:

A= (response permission ending time instant E)−(present time instant G+10 seconds)

It is to be noted that the unit of the time interval A is second.

Then at next step 204, it is determined that the time interval A calculated at step 203 is in the positive or negative in sign. In other words, at this step 204, it is determined whether the responding operation time instant is between the time instant S and the time instant P (A 0) or between the time instant P to the response permission ending time instant E (A<0).

When it is determined at step 204 that the time interval A is not in the negative in sign, since the time instant at which the responding operation is performed by the subscriber is the responding operation time instant G before the time instant P, the transmission time instant B is set at step 205 using the identification number of the receiving apparatus so that transmission of a response may be executed in a dispersed condition at the time A after the responding operation time instant G before the time instant P.

The expression for calculation of the transmission time instant B at step 205 is, for example, transmission time instant B =                                (1)
    (two lowest digits of identification number) ×
    (time interval A 100) + responding operation time instant G The reason why the time interval A is divided by 100 in the expression (1) above is that, in the present embodiment, only the two lowest digits of identification information are used to disperse the transmission time instant of a response in units of a second within the range of the time interval A.

Since the identification number of the receiving apparatus is a peculiar identification number and a random number, also the transmission time instant B is random, and transmission of response information is dispersed within the time interval A. On the other hand, when it is determined at step 204 that the time interval A is in the negative in sign, it is determined that the responding operation time instant is the responding operation time instant g within the range of 10 seconds between the time instant P and the response permission ending time instant E, and the transmission time instant B is set at step 208 so that transmission of response information is executed in a dispersed condition within a period from the responding operation time instant g to the response transmission ending time instant 0.

The expression for calculation at step 208 is, for example, transmission time instant B= (lower two digits of identification
    number)×(60/100)+responding operation time instant g    (2)

In the expression (2) for calculation above, (60/100) is a division of the time interval C (60 seconds) from the time instant P to the time instant 0 by 100 by a similar reason to that described hereinabove in connection with the expression (1).

After the transmission time instant B is calculated by the processing at step 205 or 208, transmission of a response is suspended, at step 206, until the present time instant provided from the timer circuit 37 comes to the transmission time instant B. Then, when the present time instant comes to the transmission time instant B at step 206, transmission of a response is executed at step 207. Thereafter, the routine comes to an end.

Figure 10:
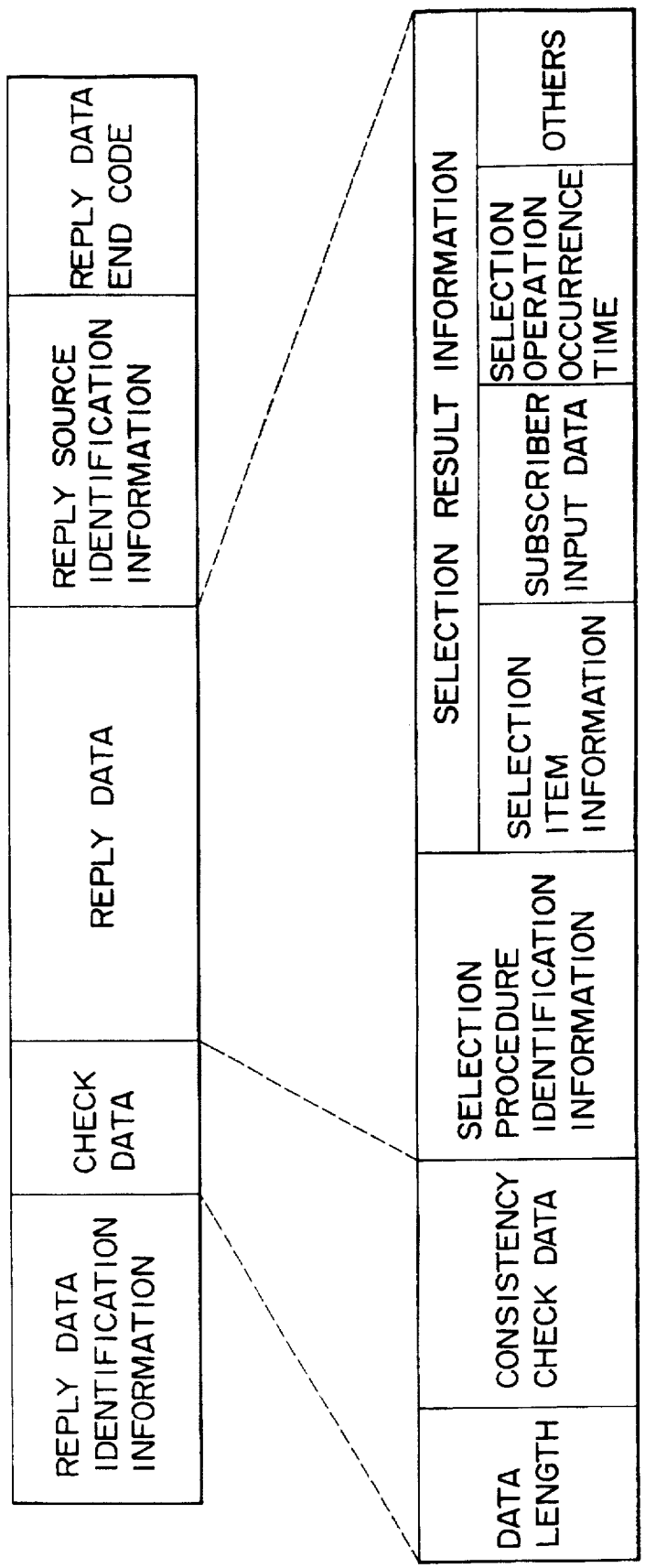
FIG. 10 is a diagrammatic view illustrating an example of response information used in the receiving apparatus of FIG. 7.

An example of a format of response information (reply data) transmitted to the reply destination by way of the modem 33 and a telephone line as a result of the transmission of response information is shown in FIG. 10.

Referring to FIG. 10, the reply data identification information at the top of the response information is an identifier for identification of whether data received by the broadcasting station side are reply data or data obtained by some other access.

The subsequent check data include information of a data length and consistency check data. The data length indicates a length of data including reply data and reply source identification information which will be hereinafter described. The consistency check data are data for checking a check sum of such reply data and reply source identification information or the like. The check data are used to check consistency whether or not data have been varied by a drop of a bit or bits or by noise upon transmission of the reply information. The following reply data includes selection procedure identification information and selection result information. The selection procedure identification information of the reply data is selection procedure identification information in sub broadcasting information multiplexed in a broadcasting signal received by the television receiver of FIG. 7. As described hereinabove, it is determined based on the selection procedure identification information to which question of which menu the answer from the subscriber is.

Even if a question 1, another question 2, ... are broadcast in this order from the broadcasting station, depending upon the situations of telephone lines, answers from a subscriber may not necessarily be returned in the same order. Therefore, such identification information as described above is required.

Further, as the selection result information, information indicative of a finally selected menu item, the time instant (responding operation time instant) at which such selection operation is performed and so forth are returned. The time instant of the timer circuit 37 is used as the information of the time instant in this instance.

It is to be noted that the responding operation time instant need not be a responding operation time instant itself but may be a difference between the transmission time instant and the responding operation time instant. In this instance, since information of the response is received by the reply destination substantially at the transmission time instant, the responding operation time instant can be recognized as a time instant prior by the time of the difference to the time instant of the reception by the reply destination.

Or, in order to identify a responding operation time point, for example, in a quiz program of the "first come, first served" type, a numeral from "0" to "9" or a symbol of a DTMF signal may be broadcast at a fixed interval in a multiplexed condition with sound similarly as described above whereas the numeral or symbol as a DTMF signal received immediately after a responding operation time point by a receiving apparatus side is replied as information regarding the responding operation time point of reply data.

The subscriber input data in the selection result information is provided taking it into consideration that, in some broadcasting programs, a selection procedure may possibly urge subscribers to perform an inputting operation. Further, the subscriber input data may possibly be, for example, a number of a credit cart or a telephone number of a subscriber replying to shopping by way of television.

For the reply source identification information next to the reply data, a number peculiar to a subscriber, for example, a telephone number of the subscriber or an identification number which is a product number of a receiving apparatus may be used. Subsequently to the reply source identification information, a reply data end code representative of an end of the reply data is sent.

Even if such point of time at which a subscriber performs its responding operation using the remote control transmitter 34 in such a manner as described above is concentrated among a large number of subscribers who enjoy the same two-way television program, the transmission time instants of actual responses can be dispersed. Consequently, transmissions of response information which otherwise occur in a temporarily concentrated condition upon a particular telephone line or lines can be dispersed, and an overcrowded condition of telephone lines can be prevented.

Further, since response information transmitted from the reception side (subscriber side) includes information regarding a responding operation time point, even if the time instant at which transmission of a responding operation actually takes place passes the response permission ending time instant, it can be determined by the reply destination side that the response has been transmitted before the response permission ending time instant. Further, since the point of time at which a responding operation is performed actually can be identified by the reply destination side irrespective of the point of time at which response information arrives at the reply destination, the two-way broadcasting method and the two-way broadcast receiving apparatus can be used for a quiz program of the "first come, first served" type.

It is to be noted that, while the two lowest digits of identification information am used in the embodiment described above, finer dispersion in time can be achieved by increasing the number of digits to be used. Meanwhile, transmissions of response information can be dispersed for individual districts by using an office number of a telephone number or a zip code. Further, while the time from the time instant P to the response permission ending time instant E is 10 seconds and the time from the time instant P to the response transmission ending time instant O is 60 seconds in the embodiment described above, the numerical values are exemplary values at all and can be set arbitrarily. Furthermore, either time information can be varied suitably by setting it by way of multiplexed information of a main broadcasting signal or by operating the remote control transmitter 34 by a subscriber to set a time input.

While, in the embodiment described above, information relating to a program such as reply destination information for responding to a two-way broadcasting program is constructed using a DTMF signal and forecast in a multiplexed condition with a main broadcasting audio signal, the information relating to a program may otherwise be multiplexed in an empty horizontal section within a vertical blanking period of a television broadcast similarly as in character multiplex broadcasting.

Figure 11:
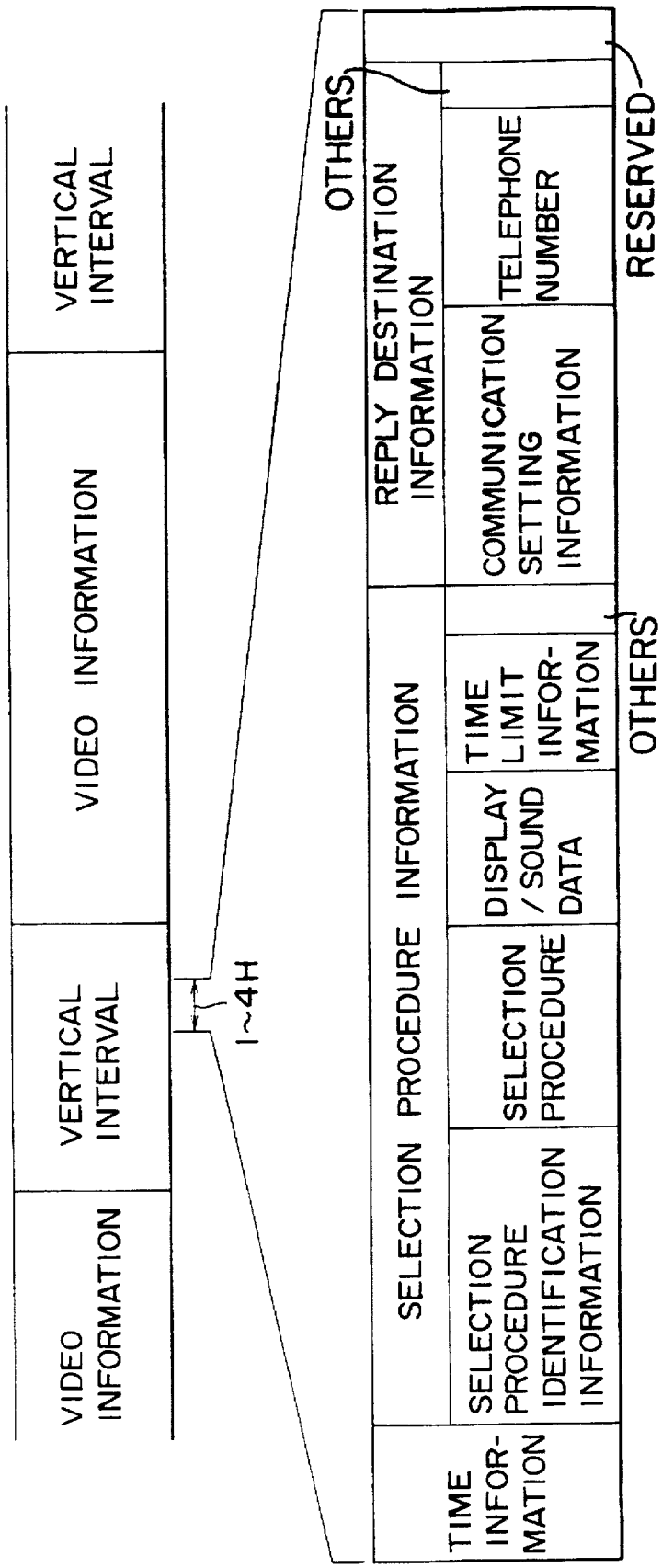
FIG. 11 is a diagrammatic view illustrating a manner of multiplexing and contents of information relating to a program.
Figure 12:
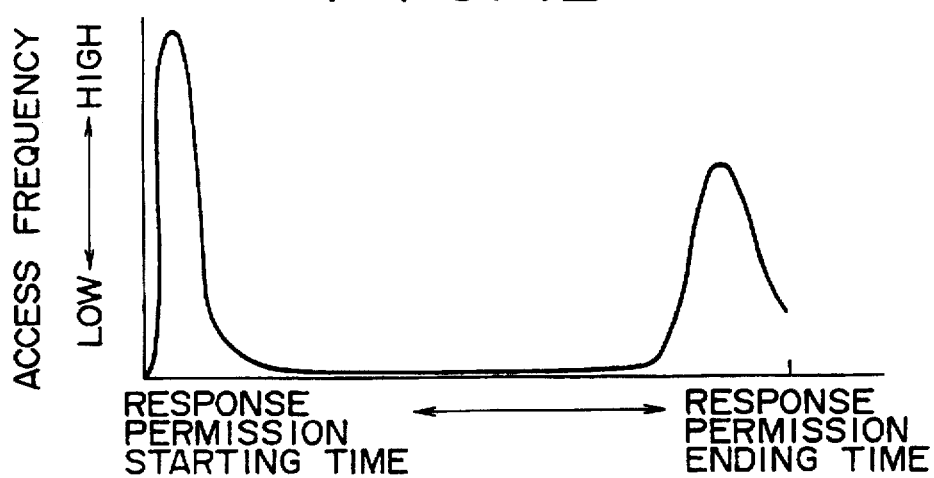
FIGS. 12, 13 and 14 are diagrams illustrating different examples of the frequency of responses from subscribers of a two-way program.
Figure 13:
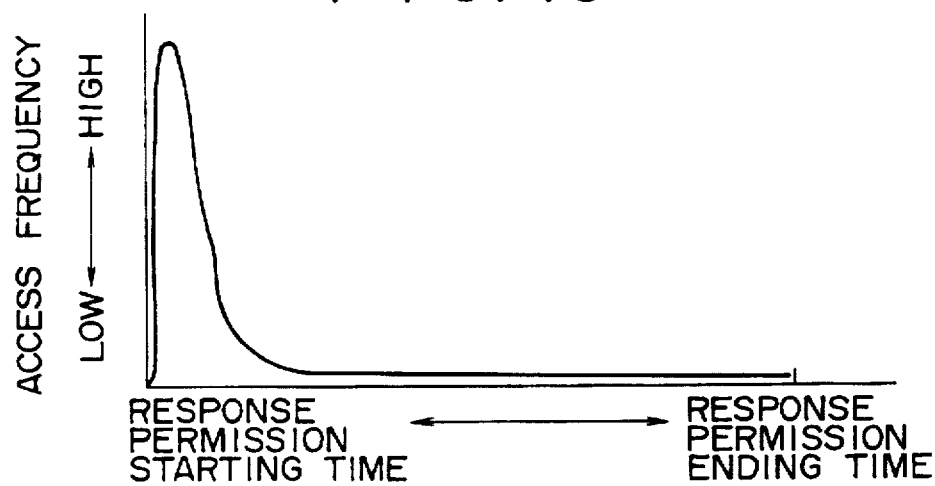
Figure 14:
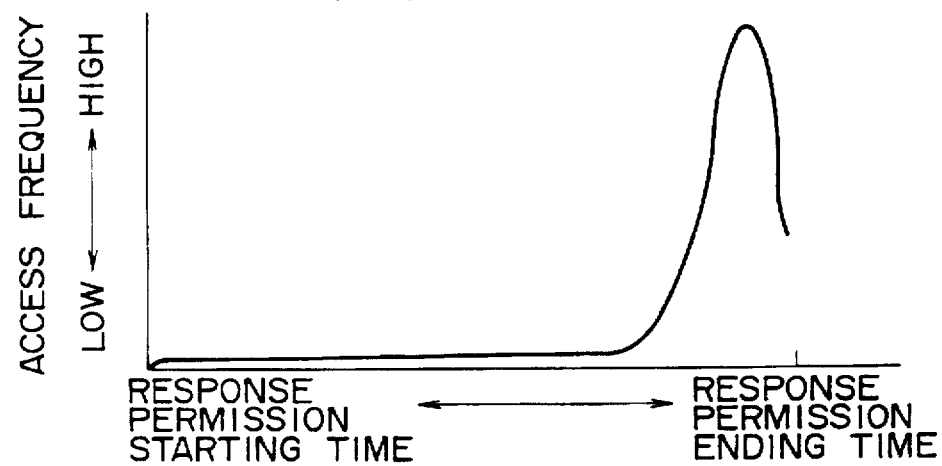

In this instance, on the broadcasting station side, such information relating to a program as illustrated in FIG. 11 is constructed in the form of a character multiplex signal and broadcast in a multiplexed condition within a vertical interval of a video signal. Meanwhile, on the receiving apparatus side, a character multiplex decoder is employed in place of the pre-processing circuit 31 and the DTMF decoder 32 in FIG. 7, and the output signal S13 of the video demodulation circuit 13 is supplied to the decoder. The decoded output of the decoder is fetched into and decoded by the control system 20 to reproduce the information relating to a program, and the information relating a program is stored into a memory such as a DRAM. Further, such reply information as illustrated in FIG. 10 is produced in response to the received information relating to a program and transmitted by way of a telephone line. Thus, on the broadcasting station side, selection procedure information, for example, for several questions of a quiz program is first produced to make preparations for broadcasting of the program. If the questions are of the type wherein one is selected from within three choices, a selection procedure wherein three choices are displayed in a menu so that one of them may be selected by a subscriber.

In the case of a quiz program, the reply destination is the reception system of the broadcasting station side, and a communication protocol to the system and a telephone number for reception are set as reply destination information.

Then, since a point of time when subscribers are requested to make an answer during broadcasting of, for example, a quiz program, time information, the selection procedure information and the reply destination information are broadcast in a multiplexed condition in a vertical interval of a video signal as described below.

FIG. 11 illustrates a manner of multiplexing and contents of information relating to a program. Referring to FIG. 11, information relating to a program is superimposed, for example, in the case of an NTSC television signal, with one to several horizontal intervals within the 14th H (H denotes horizontal interval) (or the 277th H) to the 16th (279th) H and the 21st (284th) H.

The information relating to a program illustrated in FIG. 7 makes a unit including time information, selection procedure information and reply destination information. While a unit of information relating to a program is illustrated in an all multiplexed condition within a blanking period of image data for one field in FIG. 7, the other information of the unit of information relating to a program other than the time information may be multiplexed in a plurality of fields.

Time information is time data updated, in the present modification, for each one field. Accordingly, the time information is information peculiar to each one field as different from selection procedure information or reply destination information which may span over a plurality of fields, and has the accuracy of 1/60 second in the case of an NTSC television signal. The time instant data includes the year, month and day as well as a day of the week. Naturally, the year, month and day as well as a day of the week need not be included depending upon an application.

It is to be noted that selection procedure information and reply destination information may be omitted so that only time information may be broadcast as sub broadcasting information in a multiplexed condition for each field. Further, time information need not normally be multiplexed but may be broadcast in a multiplexed condition only for a period for which responses of subscribers am anticipated, for example, only upon broadcasting of a two-way program. Further, time information need not be updated for each one field but may be updated for each plurality of fields taking an allowable time instant accuracy into consideration.

Selection procedure information is a set of programs like a communication protocol and includes, in the present modification, selection procedure identification information, information of a selection procedure, display/audio data, time limit information and other information. Since the selection procedure information may possibly include a considerably great mount of information, it may be multiplexed over a plurality of fields as described hereinabove.

The selection procedure identification information is an identifier which is added to reply information when a subscriber tries to return a result of selection and is used to allow the reply destination to discriminate to which selection procedure, that is, to which question, to which questionnaire or to which quiz question the result of selection is an answer. Reply of the selection procedure identification information allows the reply destination to determine to which question the answer is even if the answer is received but late.

The selection procedure is a program for menu selection described in a language like an intermediate language, and in accordance with a flow of operations described in the selection procedure, display such as, for example, image display, character string display or moving picture display is provided on the screen or, in some cases, a voice message is reproduced. Further, acceptance of an operation from a subscriber or responding processing such as switching of the display on the screen in response to such operation is performed.

The display/audio data include data of fonts, graphics, animations or moving pictures for use for displaying of such an image, a character string or moving pictures as described above and data for a voice message.

The time limit information includes an effective time (response permission period) for which reply to contents of selection indicated by the selection procedure identification information described above is permitted and a time until displaying is to be automatically stopped on the reception side when no operation is received in response to a menu display. When displaying is to be stopped on the receiving side, a prearranged time until a correct answer is to be broadcast is set.

Reply destination information includes communication environment setting information, a telephone number of the reply destination and other information. The communication environment setting information includes a communication rate upon reply, presence or absence of a parity, whether or not an NMP is used, an X modem system and so forth. The telephone number of the reply information is used for automatic dialing when an answer is replied by a selection operation of a subscriber, and to the reply destination of the telephone number, such reply information as illustrated in FIG. 10 is replied from a subscriber in accordance with an environment set in accordance with the communication environment setting information.

It is to be noted that, when information relating to a program is multiplexed in the character multiplex form, the receiving apparatus can form responding operation time instant information using time information in the received information relating to a program. In particular, time information in the multiplexed information when a responding operation is performed is fetched, and the time information thus fetched is transmitted as a responding operation time instant to the reply destination.

When information relating to a program is constructed in the form of a character multiplex signal as described above, the transmission rate of information is very high. Accordingly, when a telephone number of a reply destination and so forth are transmitted on a DTMF signal, it must be displayed for each digit on the screen. However, where the character multiplex broadcasting system is employed, reply destination information can be displayed at a time on the screen of the television picture tube.

It is to be noted that the application of the present invention is not limited to a case wherein information relating to a two-way program such as a reply destination is multiplexed in a main broadcasting signal as described above. For example, the present invention can be applied to a two-way broadcasting program wherein information representative of a telephone number of a reply destination or a response inputting procedure is broadcast as an image or sound by a main broadcasting signal.

Further, while, in the embodiment described above, identification information peculiar to each individual apparatus set upon production of a television receiver designed to cope with a two-way broadcasting program, that is, a product number, is employed as the identification information of a receiving apparatus, some other number such as a telephone number, a zip code or a registration number which is applied upon registration of the receiving apparatus into a data base center as described above may be employed as the identification information.

Having now fully described the invention, it will be apparent to one of ordinary skill in the art that many changes and modifications can be made thereto without departing from the spirit and scope of the invention as set forth herein.

What is claimed is:

1. In a two-way broadcasting method wherein information of a reply to a question from a broadcasting side is transmitted from a reception side to the broadcasting side by way of a telephone line, the improvement wherein:
   each receiving apparatus on the reception side has individual identification information;
   the broadcasting side broadcasts information regarding a reply destination and telephone call origination limiting information for limiting transmission of the information of a reply in a multiplexed condition with a broadcasting signal from the broadcasting side; and
   on the reception side, transmission of the information of a reply to the reply destination is inhibited when the identification information peculiar to a receiving apparatus on the reception side satisfies a condition provided by the telephone call origination limiting information for inhibiting a telephone call origination of a reply to the reply destination, wherein sub broadcasting information relating to a program such as data for accessing the two-way broadcast or data for reservation of the program is constructed using a DTMF signal within an audio signal band and is broadcast in a multiplexed condition with a main broadcasting audio signal.

2. A two-way broadcasting method according to claim 1 wherein, on the reception side, the sub broadcasting information is stored, after decoded, into storage means.

3. A two-way broadcasting method according to claim 1, wherein the identification information of each receiving apparatus on the reception side is a product number of the receiving apparatus or a telephone number of a user of the receiving apparatus.

4. A two-way broadcasting method wherein information of a reply to a question from a broadcasting side is transmitted from a reception side to the broadcasting side by way of a telephone line, the improvement wherein:
   each receiving apparatus on the reception side has individual identification information;
   the broadcasting side broadcasts information regarding a reply destination and telephone call origination limiting information for limiting transmission of the information of a reply in a multiplexed condition with a broadcasting signal from the broadcasting side; and
   on the reception side, transmission of the information of a reply to the reply destination is inhibited when the identification information peculiar to a receiving apparatus on the reception side satisfies a condition provided by the telephone call origination limiting information for inhibiting a telephone call origination of a reply to the reply destination,
   wherein the broadcasting signal is a main audio signal, and the information regarding the reply destination and the telephone call origination limiting information are broadcast in the form of a multi-frequency signal, which includes a combination of a plurality of frequencies selected one by one from a plurality of frequency groups in an audio signal band, in a multiplexed condition with the main audio signal.

5. A two-way broadcast receiving apparatus, comprising:
   inputting means for inputting information of a reply to a question or the like from a broadcasting side;
   transmission means for transmitting the inputted reply information to the broadcasting side by way of a telephone line;
   reproduction means for reproducing sub-broadcasting information regarding a reply destination multiplexed with a reception signal and telephone call origination limiting information multiplexed with the reception signal for limiting transmission of the reply information, wherein the sub-broadcasting information is constructed using a DTMF signal within an audio signal band and is broadcast in a multiplexed condition with a main broadcasting audio signal;
   storage means for storing the information regarding the reply destination and the telephone call origination limiting information reproduced by said reproduction means;
   holding means holding identification information peculiar to said receiving apparatus;

discrimination means for comparing the telephone call origination limiting information and the identification information peculiar to said receiving apparatus with each other to discriminate whether or not a telephone call origination for the reply from said receiving apparatus is permitted; and means for inhibiting, when the result of discrimination by said discrimination means proves that a telephone call origination from said receiving apparatus is not permitted, transmission of the reply information to the reply destination.

6. A two-way broadcast receiving apparatus according to claim 5, wherein the identification information peculiar to said receiving apparatus is a product number of said receiving apparatus or a telephone number of a receiving user.

7. In a two-way broadcasting method wherein a two-way broadcast including information regarding a reply destination is provided from a broadcasting station side, and information of responses of users to a two-way program is transmitted from each reception side to the reply destination by way of telephone lines, the improvement wherein:

a receiving apparatus of each reception side has identification information peculiar thereto; and when a responding operation to the two-way program is performed by a user of the receiving apparatus of the reception side, a transmission time instant is set in accordance with the identification information and the response information is transmitted to the reply destination at the thus set transmission time instant, wherein the response information to be transmitted to the reply destination includes information regarding a point of time at which the responding operation is performed.

8. In a two-way broadcasting method wherein a two-way broadcast including information regarding a reply destination is provided from a broadcasting station side, and information of responses of users to a two-way program is transmitted from each reception side to the reply destination by way of telephone lines, the improvement wherein:

a receiving apparatus of each reception side has identification information peculiar thereto; and when a responding operation to the two-way program is performed by a user of the receiving apparatus of the reception side, a transmission time instant is set in accordance with the identification information and the response information is transmitted to the reply destination at the thus set transmission time instant, wherein, upon broadcasting of the two-way program, the broadcasting station side broadcasts the information regarding the reply destination and the information regarding a response including a limit time to responses from users in a multiplexed condition with a broadcasting signal, and on the reception side, when a responding operation to the two-way broadcast is performed within the response limit time by a user of a receiving apparatus, a transmission time instant is set within a time range including a time outside the limit time in accordance with the identification information and then response information including information regarding a point of time at which the responding operation is performed is transmitted to the reply destination at the thus set transmission time instant.

9. A two-way broadcast receiving apparatus which transmits a response of a user of said receiving apparatus to a two-way program provided from a broadcasting station side, wherein the response is transmitted to a predetermined reply destination by way of a telephone line, comprising:

inputting means for inputting information of a response to the two-way program;

transmission means for transmitting the thus inputted response information to the reply destination of the broadcasting station side by way of a telephone line;

a time circuit for providing time instant information;

storage means for storing identification information allocated to said receiving apparatus; and transmission time setting means for setting a time instant at which the response information is to be transmitted in accordance with the time instant information from said time circuit and the identification information;

the response information being transmitted to the reply destination by said transmission means when the time instant set by said transmission time setting means comes, further comprising means for inserting information regarding a point of time at which the responding operation is performed into the response information.

10. A two-way broadcast receiving apparatus which transmits a response of a user of said receiving apparatus to a two-way program provided from a broadcasting station side, wherein the response is transmitted to a predetermined reply destination by way of a telephone line, comprising:

inputting means for inputting information of a response to the two-way program;

transmission means for transmitting the thus inputted response information to the reply destination of the broadcasting station side by way of a telephone line, a time circuit for providing time instant information;

storage means for storing identification information allocated to said receiving apparatus; and transmission time setting means for setting a time instant at which the response information is to be transmitted in accordance with the time instant information from said time circuit and the identification information;

the response information being transmitted to the reply destination by said transmission means when the time instant set by said transmission time setting means comes, and further comprising extraction means for extracting limit time information of responses to the two-way program multiplexed in a broadcasting signal, means for storing the thus extracted limit time information, means for inserting information regarding a point of time at which the responding operation is performed into the response information, and discrimination means for discriminating from the time information from said time circuit whether or not the time instant at which the responding operation is performed is within a predetermined time prior to a response ending time instant which is determined from the limit time to responses, said transmission time setting means setting, when the result of discrimination from said discrimination means provides that the time instant at which the responding operation is performed is within the predetermined time prior to the response ending time instant, a transmission time instant for the response information within a predetermined time after the response ending time instant.

11. A two-way broadcast receiving apparatus comprising:

receiving means for receiving broadcast signal from a broadcast side;

said broadcast signal comprises sub-broadcasting information including destination data representing a specified reply destination and limit data representing specified limits for transmission of reply data, wherein the sub-broadcasting information is constructed using a DTMF signal within an audio signal band and is broadcast in a multiplexed condition with a main broadcasting audio signal;

reproduction means for extracting said destination data and said limit data from said broadcast signal;

first storage means for storing destination data extracted from said broadcast signal second storage means for storing said limit data extracted from said broadcast signal by said reproducing means;

third storage means storing unique identification data associated with said receiving apparatus;

a comparator for comparing said identification data stored in said third storage means with said limit data stored in said second storage means;

user input means for inputting command data;

said command data comprises said reply data;

transmitting means for transmitting said reply data to a predetermined destination specified by said destination data stored in said first storage means;

controller means for controlling said transmitting means in accordance with data input by said user input means, said reply data and said limit data; and said controller comprises inhibiting means for inhibiting said transmitting means from transmitting said reply data where said comparator determines that said identification data stored in said third storage means does not match said limit data stored in said second storage means.

12. A two-way broadcast receiving apparatus according to claim 11 wherein said broadcast signal further comprises video data.

13. A two-way broadcast receiving apparatus according to claim 11 wherein said identification data comprises a product model number related to said receiving apparatus.

14. A two-way broadcast receiving apparatus according to claim 11 wherein said identification data comprises a serial number associated with said receiving apparatus.

15. A two-way broadcast receiving apparatus according to claim 11 wherein said identification data comprises a telephone number.

16. A method of interactive television broadcasting comprising the steps of:

broadcasting a broadcast signal comprising primary and secondary broadcast information, said secondary broadcast information comprising reply destination data specifying a predetermined reply destination for receiving reply data, and reply limit data for limiting the transmission of reply data to said reply destination including a limit time for replying;

receiving said broadcast signal;

separating said secondary broadcast information from said primary broadcast information;

storing said reply destination data into a first storage means;

storing said reply limit data into a second storage means;

inputting reply data;

comparing said reply limit data stored in said second storage means with identification data stored in a third storage means;

wherein said limit data stored in said second storage means correlates to said identification data stored in said third storage means, initiating communications via a telephone line with said predetermined reply destination specified by said reply destination data stored in said first storage means and transmitting said input reply data at the limit time for replying; and transmitting with said input reply data, the reply destination data regarding a point of time at which the replying operation is performed.

17. A method of interactive television broadcasting comprising the steps of:

broadcasting a broadcast signal comprising primary and secondary broadcast information, said primary broadcast information comprises video program information, said secondary broadcast information comprises reply destination data transmitted in the form of a DTMF signal within an audio signal band;

receiving said broadcast signal;

separating said separating said secondary broadcast information from said primary broadcast information;

storing said reply destination data into a first storage means;

inputting reply data;

initiating communications via telephone line with a reply destination specified by said reply destination data stored in said first storage means; and transmitting said reply data to said reply destination via said telephone line.

* * * * *

UNITED STATES PATENT AND TRADEMARK OFFICE
CERTIFICATE OF CORRECTION

PATENT NO. : 5,682,599
DATED : October 28, 1997
INVENTOR(S) : Hitoshi Yoshinobu

It is certified that error appears in the above-identified patent and that said Letters Patent is hereby corrected as shown below:

Col.2, line 51, change "cell" to --call--
Col.9, line 6, change "staffing" to --starting--
    line 10, change "staffing" to --starting--
Col.10, line 62, after "of" second occurrence, insert --"D".--
Col.12, line 45, change "pod" to --port--, both occurrences
    line 54, change "pod" to --port--
Col.14, line 65, delete "o"
    line 66, change "staffing" to --starting--
Col.15, line 67, after "week" insert --.--
Col.23, line 65, change "starling-- to --starting--
Col.28, line 23, change "am" to --are--

In the claims:
    Col.32, line 63, after "receiving" second occurrence, insert --a--
    Col.34, line 35, delete "separating said" second occurrence Signed and Sealed this Twenty-seventh Day of October, 1998

*Attest:*

BRUCE LEHMAN

*Attesting Officer*      *Commissioner of Patents and Trademarks*